US009864482B2

(12) United States Patent
Dube et al.

(10) Patent No.: US 9,864,482 B2
(45) Date of Patent: *Jan. 9, 2018

(54) METHOD OF NAVIGATING THROUGH DIGITAL CONTENT

(71) Applicant: COGNILORE INC., Gatineau (CA)

(72) Inventors: Andre Dube, Gatineau (CA); Darryl Beallie, Ottawa (CA); Brian Anderson, Nepean (CA); Cody Thompson, Orleans (CA)

(73) Assignee: Cognilore Inc., Gatineau (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/384,834

(22) PCT Filed: Mar. 13, 2013

(86) PCT No.: PCT/CA2013/000217
§ 371 (c)(1),
(2) Date: Sep. 12, 2014

(87) PCT Pub. No.: WO2013/134854
PCT Pub. Date: Sep. 19, 2013

(65) Prior Publication Data
US 2015/0026825 A1   Jan. 22, 2015

Related U.S. Application Data

(60) Provisional application No. 61/610,068, filed on Mar. 13, 2012.

(51) Int. Cl.
*G06F 3/0482* (2013.01)
*G06F 21/10* (2013.01)
(Continued)

(52) U.S. Cl.
CPC ........ *G06F 3/0482* (2013.01); *G06F 3/04842* (2013.01); *G06F 3/04855* (2013.01);
(Continued)

(58) Field of Classification Search
CPC .. G06F 17/30; G06F 17/30011; G06F 17/241; H04L 63/0428; H04L 67/306
(Continued)

(56) References Cited

U.S. PATENT DOCUMENTS 6,243,708 B1 * 6/2001 deVries ............. G06F 17/30817
7,594,258 B2 * 9/2009 Mao ...................... H04L 63/102
726/27

(Continued)

*Primary Examiner* — Abu Sholeman
(74) *Attorney, Agent, or Firm* — Rosenberg, Klein & Lee

(57) ABSTRACT

Electronic publications are increasingly replacing physical media, where standards have evolved to mimic these physical media. Accordingly it is beneficial to provide electronic publication software systems and/or software applications to enable new paradigms that provide consumers, authors, publishers, retailers, and others with a method of navigating electronic content comprising the ability to generate a user interface that supports individual page turns as well as small, moderate and large adjustments of position within the electronic content, wherein the user interface supports these adjustments in a manner that is consistent. The method further comprising the ability to receive an indication of an action by a user relating to an adjustments of position within an item of multimedia content rendered on a display device; determine a characteristic of the action; determine a first action relating to the retrieval of additional content of the item of multimedia content based on the characteristic of the action; and determine a predetermined subset of a plurality of objects to render to the user based on the characteristic of the action.

16 Claims, 22 Drawing Sheets

(51) Int. Cl.
  *G06Q 10/10*      (2012.01)
  *G06F 17/30*      (2006.01)
  *G06F 3/0484*     (2013.01)
  *G06F 3/0485*     (2013.01)
  *G06F 17/24*      (2006.01)
  *H04L 29/08*      (2006.01)
  *H04N 21/6587*    (2011.01)

(52) U.S. Cl.
  CPC ........ *G06F 17/241* (2013.01); *G06F 17/3002* (2013.01); *G06F 17/30058* (2013.01); *G06F 21/10* (2013.01); *G06F 21/105* (2013.01); *G06Q 10/10* (2013.01); *H04L 67/10* (2013.01); *H04N 21/6587* (2013.01)

(58) Field of Classification Search
  USPC ............................................. 726/28; 707/754
  See application file for complete search history.

(56) References Cited

U.S. PATENT DOCUMENTS

| | | | | |
|---|---|---|---|---|
| 8,090,694 | B2* | 1/2012 | Shahraray | G06F 17/30849 707/673 |
| 8,756,256 | B2* | 6/2014 | Tugnawat | H04W 8/183 455/411 |
| 8,800,043 | B2* | 8/2014 | Khachaturov | G06F 21/577 705/51 |
| 2005/0021512 | A1* | 1/2005 | Koenig | G06Q 50/22 |
| 2005/0160355 | A1* | 7/2005 | Cragun | G06F 17/241 715/230 |
| 2006/0020882 | A1* | 1/2006 | Beezer | G06F 17/241 715/232 |
| 2006/0143559 | A1* | 6/2006 | Spielberg | G06F 3/165 715/201 |
| 2006/0294192 | A1* | 12/2006 | Mao | H04L 67/306 709/213 |
| 2007/0198499 | A1* | 8/2007 | Ritchford | G06F 17/241 |
| 2007/0214488 | A1* | 9/2007 | Nguyen | G06F 17/30796 725/134 |
| 2008/0154908 | A1* | 6/2008 | Datar | G06F 17/30817 |
| 2008/0168073 | A1* | 7/2008 | Siegel | G06F 17/3002 |
| 2009/0248400 | A1* | 10/2009 | Luke | G06F 17/241 704/9 |
| 2009/0327889 | A1* | 12/2009 | Jeong | G06F 17/30873 715/706 |
| 2011/0173214 | A1* | 7/2011 | Karim | G06F 17/3002 707/754 |
| 2011/0258526 | A1* | 10/2011 | Supakkul | G06F 17/241 715/230 |
| 2012/0131430 | A1* | 5/2012 | Chen | G06F 17/241 715/206 |
| 2013/0024761 | A1* | 1/2013 | Bartomeli | G06F 17/241 715/230 |
| 2013/0138425 | A1* | 5/2013 | Luke | G06F 17/2705 704/9 |
| 2013/0198005 | A1* | 8/2013 | Xiong | G06Q 30/02 705/14.66 |
| 2014/0006919 | A1* | 1/2014 | He | G06F 17/241 715/230 |
| 2015/0046537 | A1* | 2/2015 | Rakib | G06F 17/3082 709/204 |
| 2015/0067466 | A1* | 3/2015 | Emanuel | G06F 17/2211 715/230 |
| 2015/0212995 | A1* | 7/2015 | Massand | G06F 17/301 715/230 |
| 2016/0239579 | A1* | 8/2016 | Zholudev | G06F 3/0482 |
| 2017/0192946 | A1* | 7/2017 | Beezer | G06F 17/241 |

* cited by examiner

1300

METHOD OF NAVIGATING THROUGH DIGITAL CONTENT

CROSS-REFERENCE TO RELATED APPLICATIONS

This patent application claims the benefit of U.S. Provisional Patent Application U.S. 61/610,066 filed Mar. 13, 2012 entitled "Methods and Systems for Digital Content" and U.S. Provisional Patent Application U.S. 61/610,068 filed Mar. 13, 2102 entitled "Methods and Systems for Digital Content", the entire contents of which are included by reference.

FIELD OF THE INVENTION

The present invention relates to electronic content and more specifically to licensing, annotating, publishing, generating, rendering, and social community engagement of electronic content.

BACKGROUND OF THE INVENTION

In 2010, Google estimated that since the invention of printing, approximately 130,000,000 unique titles had been published. When writing systems were invented in ancient civilizations, approximately 6,000 years ago, words were not separated from each other (scriptural continua) and there was no punctuation and employed various media including tree bark, clay, stone, and metal. Texts were written from right to left, left to right, and even so that alternate lines read in opposite directions. Today, many languages including Japanese, Hebrew, Arabic, and Chinese remain as right-to-left languages whereas those derived from the Greek, Latin and Cyrillic languages are left-to-right. Additionally Chinese and Japanese are read bottom-to-top whereas Hebrew, Arabic, and those derived from Greek, Latin and Cyrillic languages are top-to-bottom. Accordingly, even today there are multiple structures for text even ignoring the 82 languages with over 10 million native speakers and the 7,358 recognised languages ("Ethnologue: Languages of the World").

Since the early-20th century to today the majority of books are printed by offset lithography although the introduction in the late-20th century, use computer-to-file and computer-to-plate systems further increased quality as well as allowing electronic distribution of content from a publisher to the printer. These technologies led to publishing concepts such as "print on demand", which make it possible to print as few as one book at a time, have made self-publishing much easier and more affordable whilst also allowing publishers to keep low-selling books in print rather than declaring them out of print. Also in the late 20th Century the combination of advanced word processing software, graphic image processing software, and standards for document exchange combined with the raid penetration of the Internet resulted in much of the new information generated not being printed in paper books but being available online through websites, digital libraries, CD/DVD/NAND ROM, or in the form of e-books. Additionally, the Internet has resulted in a rapid proliferation of information and written content overall despite erosion generally in writing skills of users of the Internet. An on-line book is an electronic book that is available online through the Internet whereas, at present, an e-book, being a contraction of "electronic book", refers to a digital version of a conventional print book although with time these distinctions will be lost. Today the majority of content on the Internet is presented through extendable markup languages such as Extensible Markup Language (XML) and Hypertext Markup Language (HTML) which control their appearance within webpages and websites.

Numerous e-book formats have emerged and proliferated over the past twenty years for electronic publishing (ePublishing), some supported by major software companies such as Adobe with its Portable Document Format (PDF) approach, and others supported by independent and open-source programmers including EPUB (also referred to as ePUB, ePub, EPub, and epub) which became an official standard of the International Digital Publishing Forum (IDPF) in 2007 superseding the older Open e-book standard. Today the vast majority of downloadable content from the Internet is PDF based.

EPUB has become a leading format for e-books alongside PDF as it is free and open, supports re-flowable (word wrap) and re-sizable text, supports inline raster and vector images, allows embedded metadata, provides digital rights management (DRM) support, Cascading Style Sheets (CSS) styling, alternative renditions in the same file, use of out-of-line and inline Extensible Markup Language (XML) islands (an XML island is a piece of XML embedded within an HTML document to associate data with an HTML object to extend the functionality of the HTML).

Like EPUB PDF is an open standard for document exchange. However, unlike EPUB, PDF was originally a proprietary format controlled by Adobe for representing documents in a manner independent of application software, hardware, and operating systems. It was officially released as an open standard in 2008, and published by the International Organization for Standardization (ISO) as ISO 32000-1:2008. At the same time Adobe published a Public Patent License to ISO 32000-1 granting a royalty-free rights for all patents owned by Adobe that are necessary to make, use, sell and distribute PDF compliant implementations. Each PDF file encapsulates a complete description of a fixed-layout flat document, including the text, fonts, graphics, and other information needed to display it. Accordingly, PDF documents are fixed in layout and do not reflow according to the rendering device's screen dimensions or orientation as EPUB does. Other standards in addition to PDF and EPUB are also employed including, for example, the AZW and MOBI eBook formats.

In contrast to the fully self-contained PDF an EPUB file uses XHTML 1.1 to construct the content of a book. Styling and layout are performed using a subset of CSS 2.0 such that this specialized syntax requires only a portion of CSS properties to be supported by e-reading systems and adds a few custom properties such as page-header and page footer. EPUB also requires that PNG, JPEG, GIF, and SVG images be supported using Multipurpose Internet Mail Extensions (MIME) and whilst other media types are allowed, creators must include alternative renditions using supported types. EPUB requires Unicode and content producers must use either UTF-8 or UTF-16 encoding in order for EPUB to support international and multilingual books. However, reading systems are not required to provide the fonts necessary to display every Unicode character, though they are required to display at least a placeholder for characters that cannot be displayed fully.

To date e-book applications have been focused to only one aspect of the multi-faceted world of publishing, namely the replacement of physical books with an electronic book format. Accordingly it would be beneficial to provide users with an e-book software system that addressed the multiple facets of publishing that have evolved over the past two hundred years of publishing since steam-presses automated printing in conjunction with e-book software applications on their electronic devices. It would also be beneficial for the e-book software systems and/or software applications to leverage the benefits and potential that the Internet and high-speed communications provide including, but not limited to leveraging social media, supporting crowd sourcing, allowing streaming content, supporting multimedia content within annotations, and supporting hyperlinks within annotations.

Document Navigation:

Within the prior art navigating documents presented within webpages and applications has historically been accomplished through a scrollbar, usually appearing on one or two sides of the viewing area as long rectangular areas containing a bar (or thumb) that can be dragged along a trough (or track) to move the body of the document as well as two arrows on either end for precise adjustments. The "thumb" has different names in different environments, on the Macintosh it is called a "scroller"; on the Java platform it is called "thumb" or "knob"; Microsoft's .NET documentation refers to it as "scroll box" or "scroll thumb"; in other environments it is called "elevator", "quint", "puck", "wiper" or "grip". While dragging the thumb is historically the traditional way of manipulating a scrollbar, a scroll wheel may also be used, and optionally displayed arrow buttons may be clicked to scroll a small amount, or the trough above or below the thumb for a larger amount. The user may engage the scroll bar/thumb through a mouse on many electronic devices In contrast electronic readers for displaying ePUB and PDF files are generally engaged today through a touch-screen on the tablet, electronic reader, etc or other electronic devices that the user is using wherein electronic reader software detects a lateral "swipe" (finger motion across the touch-screen) as indicating the user wishes to turn the page forwards or backwards. This has been considered acceptable to date as the majority of ePUB/PDF documents published are novels which, even if they are very long such as "War and Peace" are read sequentially by the user. However, user manuals, dictionaries, reference texts, statutes, periodicals, journals, magazines, and a wide range of other published materials whether text based or other media including audio, video, multimedia, computer generated imagery, etc. are accessed in a non-sequential manner in that the user wishes to progress to a specific element of the published material, search for an element of the published content or browse through it starting at an essentially pseudo-random point.

Accordingly, using an ePUB format for a 250 page text requires the user to execute 200 "swipes" to reach page 200 in the linear method of the prior art electronic reader software. Similarly, a user at page 400 requires 300 "swipes" to go backwards to page 100 where the electronic reader software remembers the user's last point in the text. However, a lawyer accessing a statute, a student accessing a reference text, or a mechanic accessing a manual will repeatedly access these documents at different points making navigation in such prior art means time consuming activities for the user. It would therefore be beneficial for a user to be able to rapidly shift their position within an item of published content using a user interface that supported individual page turns as well as small, moderate and large adjustments of position within the published content. It would be further beneficial for this user interface to support all these adjustments with a consistent user engagement rather than requiring the user to exploit multiple menus.

Indexing and Searching:

Within the prior art physically published content typically comprises a table of contents, the contents, and an index. This index comprises references to portions of the content and their location within the content. However, the terms in the index are selected by the publisher and represent only a portion of those within the content overall and may or may not represent actual elements of content. Within prior art electronic content published through EPUB the basic approach remains unchanged from the physical books it is intended to replace. In contrast other forms of electronic content such as Word documents, emails, and some PDF documents the content can be searched for any term through a search feature wherein the user types in the term or phrase they are seeking. However, every search requires that the content of the published content is searched again.

It would therefore be beneficial for any content released to be indexed completely once so that any term within the published content forms the basis for linking to a predetermined position within the published content wherein that term exists. It would be evident that beneficially such completely indexed published content would allow fast searching of published content and associated annotations where searching speed is now less dependent upon the size of the published content as it is not searched every time but once and subsequently a complete or substantial index of the published content and/or associated annotations is searched. Beneficially annotations may therefore be indexed separately and filtered prior to rendering search results. Additionally, the identification of multiple occurrences concurrently in the search allows alternative rendering of occurrences.

Fingerprinting and Encrypting:

Historically within the prior art copying published content required another individual to copy it physically with paper, ink, etc. Subsequently photography, offset lithography, and photocopying reduced the cost of copying wherein protection was primarily embodiment through watermarks within the original documents paper or the difficulties/cost of copying in significant quantities and same format. With electronic content that changed dramatically such that today published content is typically protected from copying by applying protection to the published content such as with PDF documents or is encrypted such as is employed in electronic content marketplaces such as Apple iTunes™ and Amazon AZW for example. However, such techniques are restrictive in respect of either being tied to a specific license and specific electronic device.

It would be beneficial for protection applied to published content to allow the license to be re-assigned to another user allowing enterprises to assign licenses to personnel and adjust as these personnel change or business requirements adjust or a user to purchase a license to published content and gift the published content to another. Neither instance is supported by the currently utilised digital rights management (DRM) techniques nor do such techniques allow for released published content to be traced subsequently upon identification of additional unlicensed copies so that the source of the original content can be identified. Obsolescence is normally an issue in electronic content from the user's viewpoint where DRM publishing systems are obsoleted through closure of enterprises providing them or electronic devices supporting them are unavailable. However, adjusting the publishing model of published content wherein publishers can publish multiple sequential releases of the content such that obsolescence is now a concern of those pirating the original published content as any release is obsoleted soon after its release.

It would also be beneficial for such e-book software systems and/or software applications to enable new paradigms that provide consumers, authors, publishers, retailers, and others with new models for releasing digital content from editorial and authorship viewpoints; new models for providing digital rights management; new models for publishers to release revised editions, errata, new additions, etc; new methods of engaging social networks within work and private environments with associated content (annotations) to the original release content; and supporting discussion and information dissemination within a wide variety of environments from education to business to book clubs etc. Within such e-book software systems and/or software applications the inventors consider primary (electronic) content as being content having defined authorship and released with or without digital rights, and secondary (electronic) content as being additional content associated with predefined elements of the primary content generated by one or more users with associated characteristics in terms of releasing the secondary content to one or more other users.

Accordingly the inventors have addressed providing benefits in terms of providing access to electronic content; supporting community interaction with electronic content; licensing electronic content with re-assignable rights and the ability to issue sub-rights; generating and rendering combined content from primary content and one or more secondary content sources with low network overhead; providing the ability to issue partial licenses to users with predetermined validity; and distributing electronic content with fingerprinting allowing unique identification of sources of non-authorised content. Additionally users address the navigation of e-books generically rather than the current dominant sectors of works of fiction and historical non-fiction such as biographies. Such works are read sequentially and accordingly easily rendered in a linear fashion to the user. However, a dictionary, a thesaurus, a user manual, a set of legal statutes, a cookery book are accessed in manners that may be described as non-linear or randomly by users such that different renditions of location and movement with the electronic content are required other than a table of contents, page numbers, and an index which mimic their historical paper predecessors or releases.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations and disadvantages of the prior art with respect to electronic content and more specifically to licensing, annotating, publishing, updating, delivering, searching, generating, rendering, and social community engagement of electronic content.

In accordance with an embodiment of the invention there is provided a method comprising:
receiving an indication of an action by a user relating to adjusting the portion of content of an item of multimedia content rendered to a user on a display;
determining a characteristic of the action with a microprocessor;
determining a first action relating to the retrieval of additional content of the item of multimedia content in dependence upon the characteristic of the action; and
determining a predetermined subset of a plurality of objects to render to the user in dependence upon the characteristic of the action.

In accordance with an embodiment of the invention there is provided a method comprising:
receiving content relating to an item of multimedia content on a computer system comprising a memory and a microprocessor;
parsing the content with a microprocessor to identify each occurrence of a unique item of a plurality of unique items within the multimedia content;
associating location information to each occurrence of the unique item of the plurality of unique items within the item of multimedia content; and
generating a content index of the item of multimedia content comprising the unique item of the plurality of unique items and the location information relating to each occurrence of the unique item of the plurality of unique items within the item of multimedia content.

In accordance with an embodiment of the invention there is provided a method comprising:
receiving at a computer system a request from a software application in execution upon a remote computer system for a predetermined portion of an item of content;
retrieving from a first memory a predetermined portion of primary content, the primary content being the item of content as published by its publisher;
retrieving from a second memory a predetermined portion of secondary content, the secondary content being generated by a first user having a first license to the item of content;
merging the retrieved primary and secondary content to generate combined content;
rendering the combined content for display to a second user having a second license to the item of content, the rendered combined content being the requested predetermined portion of the item of content;
generating a fingerprint relating to this instance of generating the rendered combined content and adding the fingerprint to the rendered combined content; and
encrypting the fingerprinted rendered combined content for transmission to the remote electronic device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
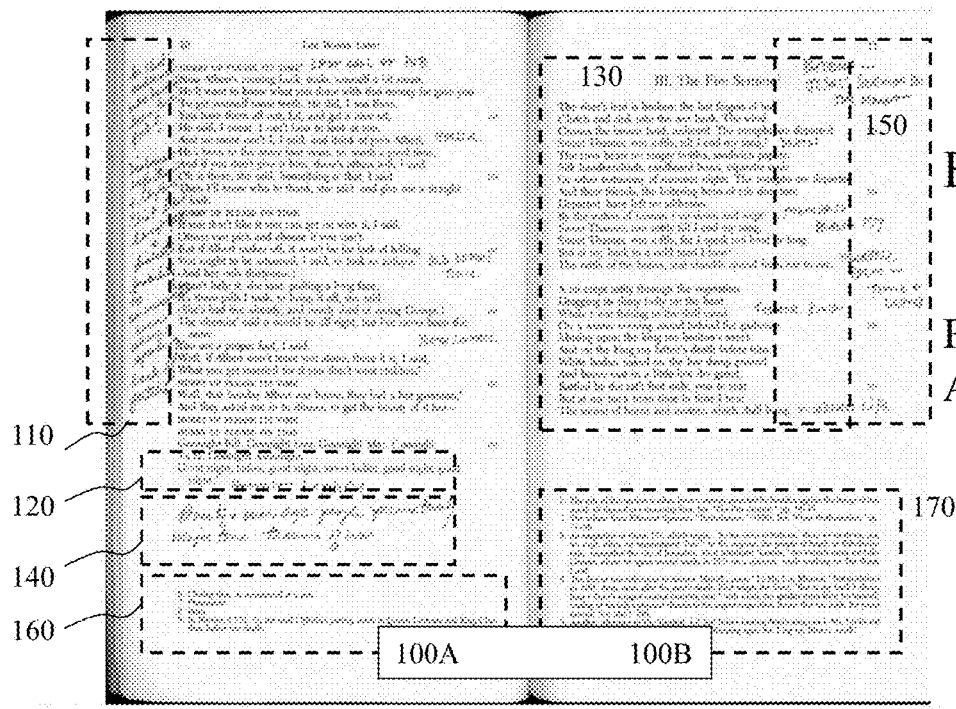
FIG. 1 depicts an example of annotations made by a user of a conventional paper based book according to the prior art.

The present invention is directed to electronic content and more specifically to licensing, annotating, publishing, distributing, updating, searching, generating, rendering, and social community engagement of electronic content.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims. Where embodiments of the invention are described with respect to process flows or flowcharts then these are described with respect to this embodiment. It would be evident that two or more flowcharts may be combined or linked.

A "mobile electronic device" as used herein and throughout this disclosure, refers to a wireless device used for communication that requires a battery or other independent form of energy for power. This includes, but is not limited to, devices such as a cellular telephone, smartphone, personal digital assistant (PDA), portable computer, pager, portable multimedia player, portable gaming console, laptop computer, tablet computer, and an electronic reader. A "fixed electronic device" (FED) as used herein and throughout this disclosure, refers to a wireless device or wired device used for communication that does not require a battery or other independent form of energy for power. This includes, but is not limited to, devices such as Internet enable televisions, gaming systems, desktop computers, kiosks, and Internet enabled communications terminals.

A "network operator" or "network service provider" as used herein may refer to, but is not limited to, a telephone or other company that provides services for mobile phone subscribers including voice, text, and Internet; telephone or other company that provides services for subscribers including but not limited to voice, text, Voice-over-IP, and Internet; a telephone, cable or other company that provides wireless access to local area, metropolitan area, and long-haul networks for data, text, Internet, and other traffic or communication sessions; etc.

A "software system" as used as used herein may refer to, but is not limited to, a server based computer system executing a software application or software suite of applications to provide one or more features relating to the licensing, annotating, publishing, generating, rendering, encrypting, social community engagement, storing, merging, and rendering electronic content and tracking of user and social community activities of electronic content. The software system being accessed through communications from a "software application" or "software applications" and providing data including, but not limited to, electronic content to the software application. A "software application" as used as used herein may refer to, but is not limited to, an application, combination of applications, or application suite in execution upon a portable electronic device or fixed electronic device to provide one or more features relating to one or more features relating to the licensing, annotating, publishing, generating, rendering, encrypting, social community engagement, storing, merging, and rendering electronic content and tracking of user and social community activities of electronic content.

"Primary content" and "Title" as used herein and throughout this disclosure refers to, but is not limited to, electronic content generated by an author and/or published by a publisher with or without content digital rights which is made available through a software system to a user via a software application with a procurement process that may or may not require a financial transaction between the user and a provider of the primary content. The provider may be the author, publisher, an operator of the software system, or a third party engaged by one or more of the preceding. The primary content may include one or more of text, characters, audiovisual content and multimedia content relating to an author or authors relating to a subject or subjects. Examples of primary content may include e-books and other electronic documents including, but not limited to, novels, manuals, user guides, reference materials, reviews, specialist subject materials, journals, newspapers, music, movies, cartoons, videos, television programming, brochures, and software.

"Secondary content" as used herein and throughout this disclosure refers to, but is not limited to, electronic content generated by a user with or without digital rights which is made available through available through a software system to a user via a software application with or without user digital rights associated with said secondary content. Said user digital rights relating to the predetermined portion of a community of users of the software system/software application that may view the secondary content generated by the user. The secondary content may include one or more of text, characters, audiovisual content and multimedia content.

A "publisher" as used herein and through this disclosure refers to, but is not limited to, an enterprise or organization engaged in publishing through performing one or more stages of the development, acquisition, copyediting, graphic design, production, release, and marketing and distribution of electronic content, referred to in this specification as primary content. Typically publishers acquire content from authors but authors may be their own publishers, meaning, originators and developers of electronic content can also deliver the electronic content for the same. An "author" as used herein and through this disclosure refers to, but is not limited to, an individual or group of individuals who originate or give existence to anything that may be considered electronic content and their authorship determines responsibility for what is created. More traditionally an author is the originator of any written work which may be represented electronically as electronic content. However, an author may originate through one or more of text, characters, audiovisual content and multimedia content.

A "user" as used herein and through this disclosure refers to, but is not limited to, a person or device that utilizes the software system and/or software application (SS-SA) and as used herein may refer to a person, group, or organization that has registered with the SS-SA to acquire primary content and generates secondary content in association with the primary content. A "curator" or "librarian" as used herein and through this disclosure refers to, but is not limited to, a person or group of individuals having rights to manage one or more aspects of the license(s) of primary content and their associated sub-licenses as well as one or more aspects of the associations of users to groups and the according distribution of the secondary content from these users.

Referring to FIG. 1 there is depicted an image of an example of annotations made by a user of a conventional paper based book 100 according to the prior art. As depicted the book 100 is open and has left page 100A and right page 100B comprising pages 10 and 11 of a book of poetry. Left page 100A comprises "The Waste Land" wherein the last two lines are indicated by first box 120 and right page 100B comprises "III. The Fire Sermon" wherein the whole poem is indicated with second box 130. Down the left hand side of first page 100A are first annotations 110 written by hand by a reader of the poem "The Waste Land" and beneath are second annotations 140. Other annotations are indicated on right page 100C by handwritten notes 150. At the bottom of each of left and right pages 100A and 100B respectively are first and second footnote lists 160 and 170 respectively that contain translations, modern equivalents, citations, and references to aid the reader in understanding the poem.

This conventional structure of pages with margins (not identified but forming the defined white space around the border of the page), footnotes, and page numbers has been maintained within the PDF structure which represents one of the two dominant formats of electronic publishing for written content. As such content generated today within a desktop publishing application and converted to PDF format is paginated according to the settings of the application by default or as set by the user when generating the PDF. Accordingly when displayed upon different devices with different screen dimensions the page will be dimensions to fit unless the user zooms. For many portable electronic devices the required magnification is such that the user must scroll left-right and up-down to read the entire content of one page before moving to the next page. This pre-paginated fixed dimension structure of PDFs is not reflected in EPUB structured content which is rendered with a predetermined character format such that the amount of content displayed in each electronic device varies with screen dimension and user adjustment in the character font size.

Figure 2:
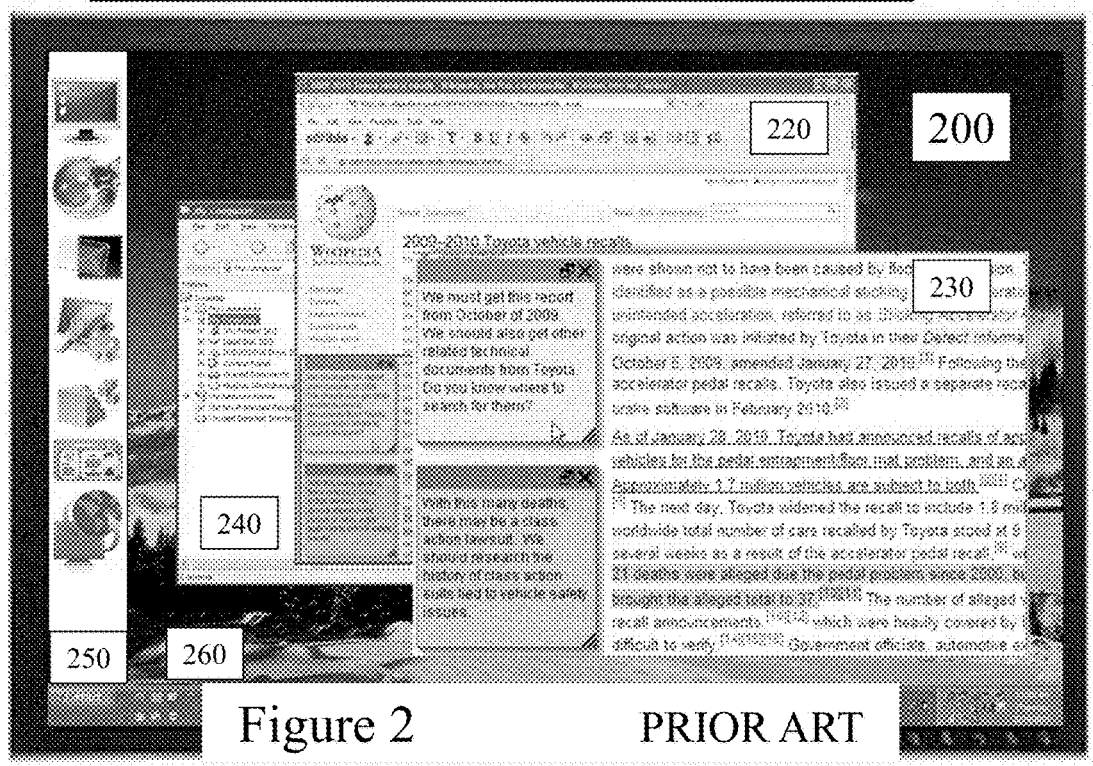
FIG. 2 depicts an exemplary screenshot of a prior art software application "Scrible" for annotating electronic content.
Figure 3:
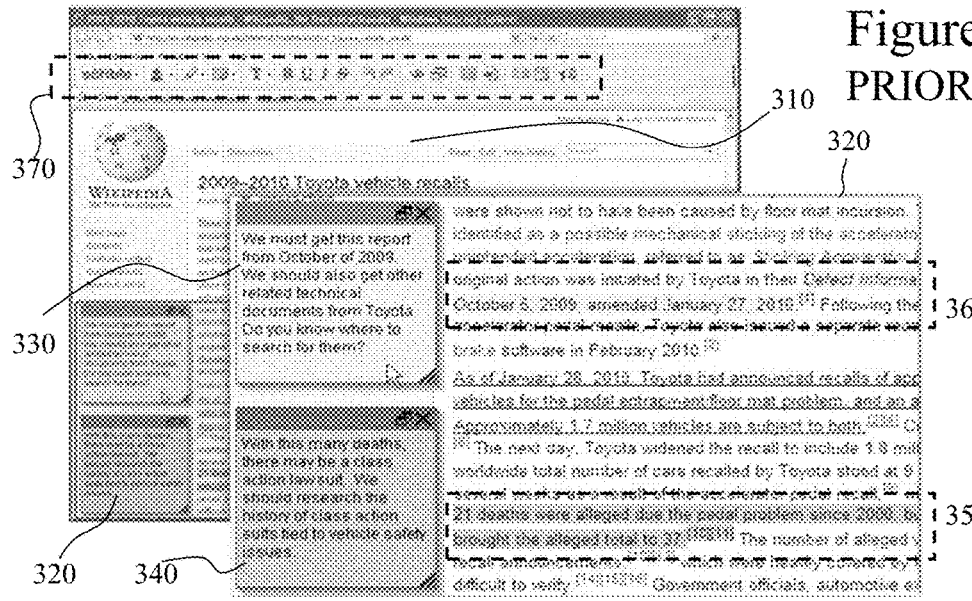
FIG. 3 depicts an details of the prior art software application "Scrible" depicted in FIG. 2.

Now referring to FIG. 2 there is depicted an exemplary screenshot 200 of a prior art software application "Scrible" for annotating electronic content within a web page. As depicted a screen displays a background 260 and application toolbar 250 together with "Explorer" window 240 and webpage 220 which depicts part of a Wikipedia™ article relating to "2009-2010 Toyota vehicle recalls" which has been annotated as evident from annotation window 230. Webpage 220 and annotation window 230 are depicted in expanded form in FIG. 3 with first and second webpages 310 and 320 respectively. Within first webpage 310 is shown "Scrible" toolbar 370 which has been accessed by the user and provides the user with a variety of tools for annotating. Second webpage 320 shows first and second annotations 330 and 340 respectively together with first and second highlighted text sections 360 and 350 which were highlighted by the user prior to associating first and second annotations 330 and 340 respectively to them.

Figure 4:
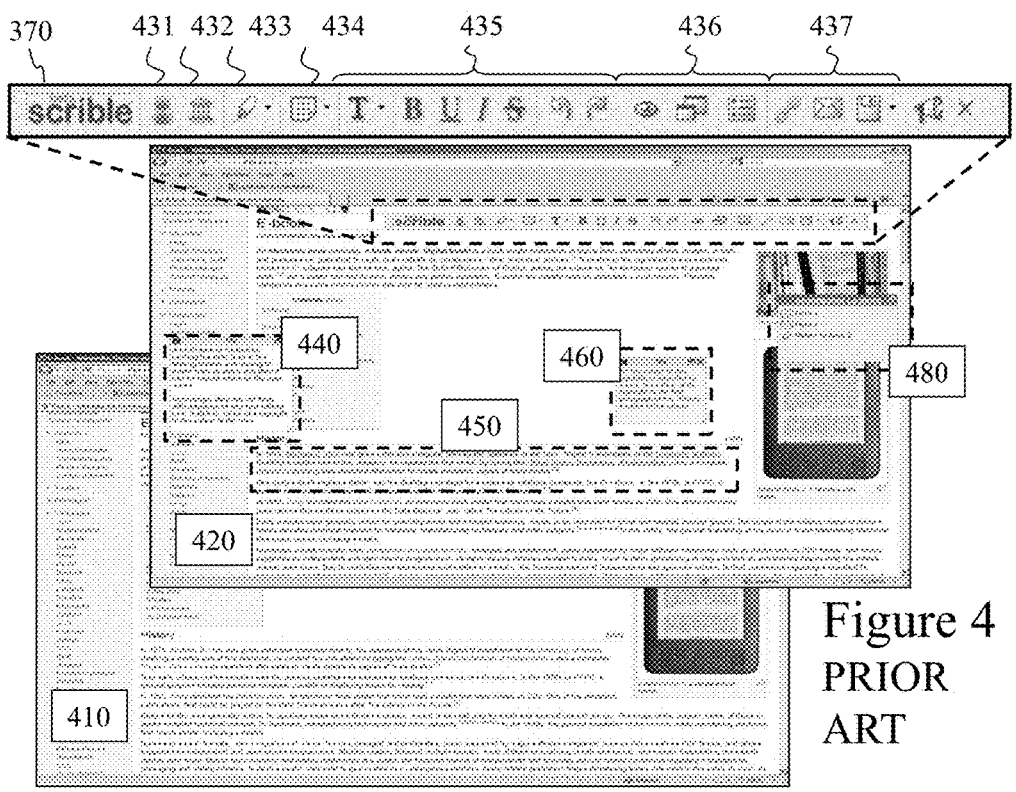
FIG. 4 depicts an exemplary use of the prior art software application "Scrible"

The "Scrible" toolbar 370 is depicted again in FIG. 4 wherein features within the "Scrible" toolbar 370 are indicated including "Sign-In" 431, "Library" 432, "Highlight" 433, "Add Note" 434, "Text Format" buttons 435, "Display-Hide Annotations-Notes" buttons 436, and "Link-Mail-Save" buttons 437. These elements in the "Scrible" toolbar 370 allow a user to annotate a webpage such as shown in first image 410 which when annotated appears as shown in second image 420. Accordingly within second image 420 there are shown "Scrible" toolbar 370 and bookmark 440 together with annotation 460 and associated highlighted text 460. Also shown is annotations legend 480 which allows a user to keep track of the notes and associated highlights. Accordingly, a user may through "Scrible" toolbar 370 add annotation to a webpage and then "Link-Mail-Save" buttons 437 which allow the user to create a link to the annotated web page to provide to other users, email the annotated page to another known user, and save the annotated web page to a "Scrible" account associated with the user. Accordingly a user must know another user in order to provide a link from their annotated web page or to email the annotated web page to them.

Figure 5:
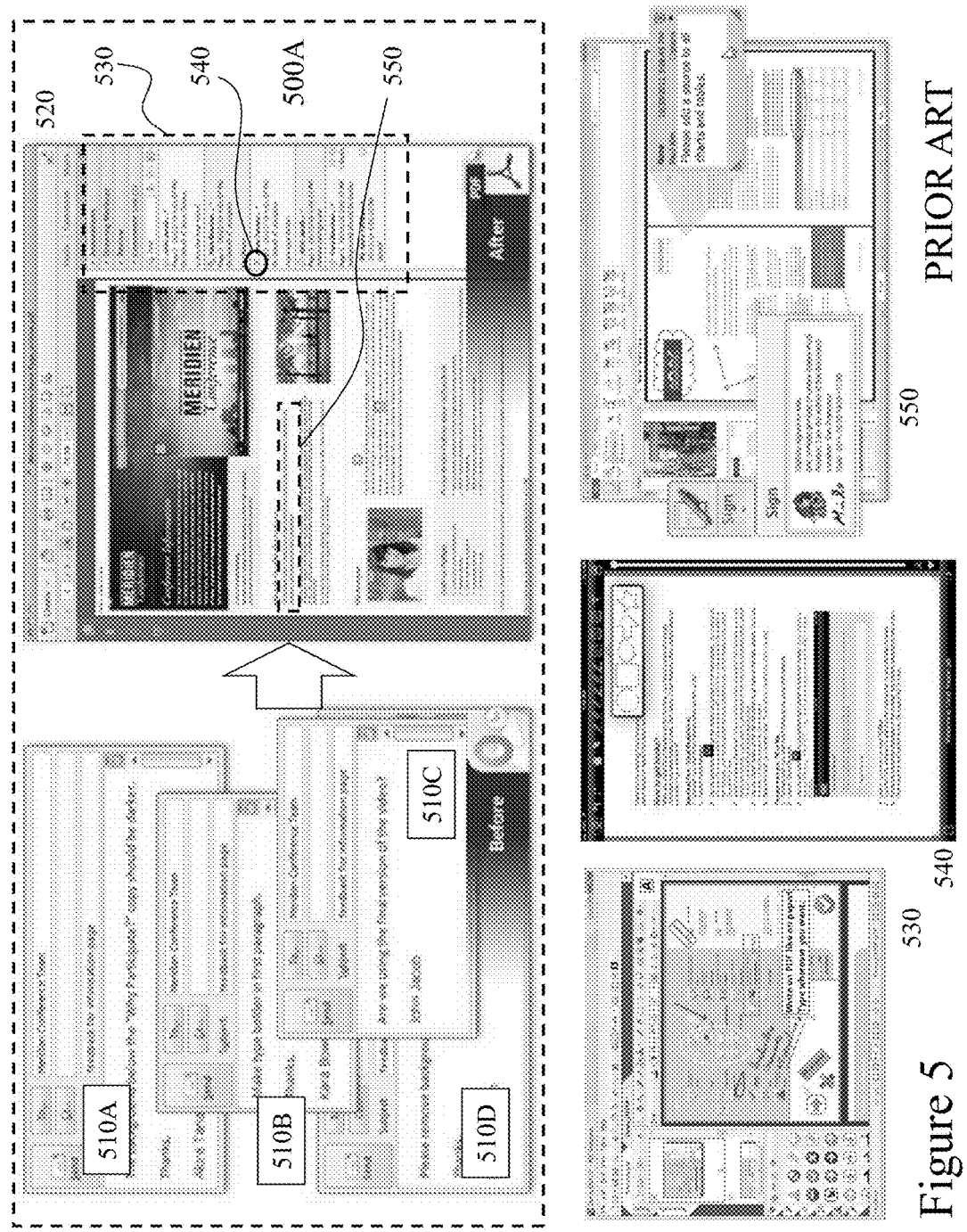
FIG. 5 depicts examples of other prior art software applications for annotating web based and PDF based electronic content.

Referring to FIG. 5 there are depicted examples of other prior art software applications for annotating web based and PDF based electronic content. These include Adobe Acrobat 500A which allows comments from first to fourth users 510A through 510D to be distributed to a user group for incorporation into the next revision of the PDF document during editing process 520. Such distributed release of an initial version of a document with comments returned by email exists with other applications, e.g. Microsoft Word, but within Adobe Acrobat this is extended wherein when the author opens the document to edit it in editing process 520 the user sees the emails directly within sidebar window 530. Further, where a reviewer has highlighted content 550 this is reflect in indicators 540 within the sidebar window 530. Also depicted in FIG. 5 are images from Grahl's "PDF Annotator" 530, neu.Pen's "neu.Annotate PDF" 540, and Nitro's "PDF 7" 550 which represent three of the multiple annotating applications developed for annotating PDF content. These other applications provide text based annotations, either typed or handwritten, and exploit colour for associating annotations to elements of the PDF.

Figure 6:
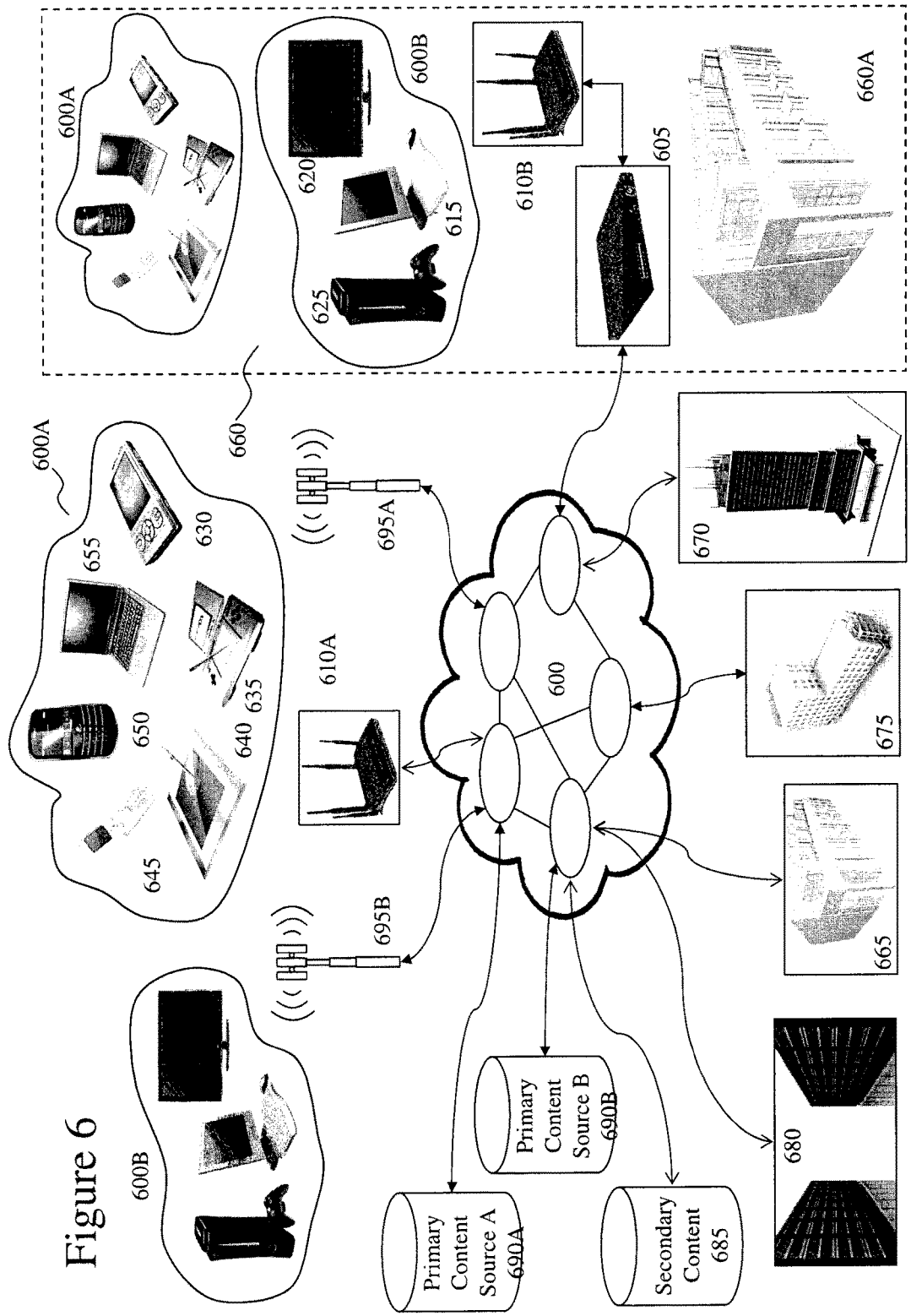
FIG. 6 depicts a network supporting communications and interactions between devices connected to the network and a software system according to an embodiment of the invention.

Now referring to FIG. 6 there is depicted a network supporting communications and interactions between devices connected to the network and a software system according to an embodiment of the invention. As shown first and second user groups 600A and 600B respectively interface to a telecommunications network 600. Within the representative telecommunication architecture a remote central exchange 680 communicates with the remainder of a telecommunication service providers network via the network 600. The central exchange 680 is connected via the network 600 to local, regional, and international exchanges (not shown for clarity) and therein through network 600 to first and second wireless access points (AP) 695A and 695B respectively which provide Wi-Fi cells for first and second user groups 600A and 600B respectively. Also connected to the network 600 are first and second Wi-Fi nodes 610A and 610B, the latter of which being coupled to network 600 via router 605. Second Wi-Fi node 610B is associated with first building 660A and having within this environment 660 first and second user groups 600A and 600B which are connected to the network 600 via wireless interfaces such as second Wi-Fi node 610B via router 605. Second user group 600B may also be connected via wired interfaces which may or may not be routed through a router such as router 605.

Within the cell associated with first AP 695A the first group of users 600A may employ a variety of portable electronic devices including for example, laptop computer 655, portable gaming console 635, tablet computer 640, smartphone 650, cellular telephone 645 as well as portable multimedia player 630. Within the cell associated with second AP 695B are the second group of users 600B which may employ a variety of fixed electronic devices including for example gaming console 625, personal computer 615 and wireless/Internet enabled television 620 as well as cable modem 605.

Also connected to the network 600 is cell tower 690 that provides, for example, cellular telephony services as well as evolved services with enhanced data transport support. Cell tower 690 proves coverage in the exemplary embodiment to first and second user groups 600A and 600B. Alternatively the first and second user groups 600A and 600B may be geographically disparate and access the network 600 through multiple cell towers, not shown for clarity, distributed geographically by the network operator or operators. Accordingly, the first and second user groups 600A and 600B may according to their particular communications interfaces communicate to the network 600 through one or more wireless communications standards. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access.

Also connected to the network 600 are first to third enterprises 665 through 675 which may for example represent locations for authors, publishers, software system/software application providers, and users which may exploit combinations of wired and wireless networks. First and second primary content sources 690A and 690B together with secondary content source 685 are also connected to network 600 which respectively house primary content generated by authors and/or publishers and secondary content generated by users respectively. Additionally first and second primary content sources 690A and 690B together with secondary content source 685, and others not shown for clarity, may host according to embodiments of the inventions multiple services associated with a provider of the software system(s) and/or software application(s) associated with the electronic content distribution including, but not limited to, dictionaries, speech recognition software, product databases, inventory management databases, retail pricing databases, license databases, customer databases, and software applications for download to fixed and portable electronic devices. First and second primary content sources 690A and 690B together with secondary content source 685 may also host for example other Internet services such as a search engine, financial services, third party applications and other Internet based services.

Figure 7:
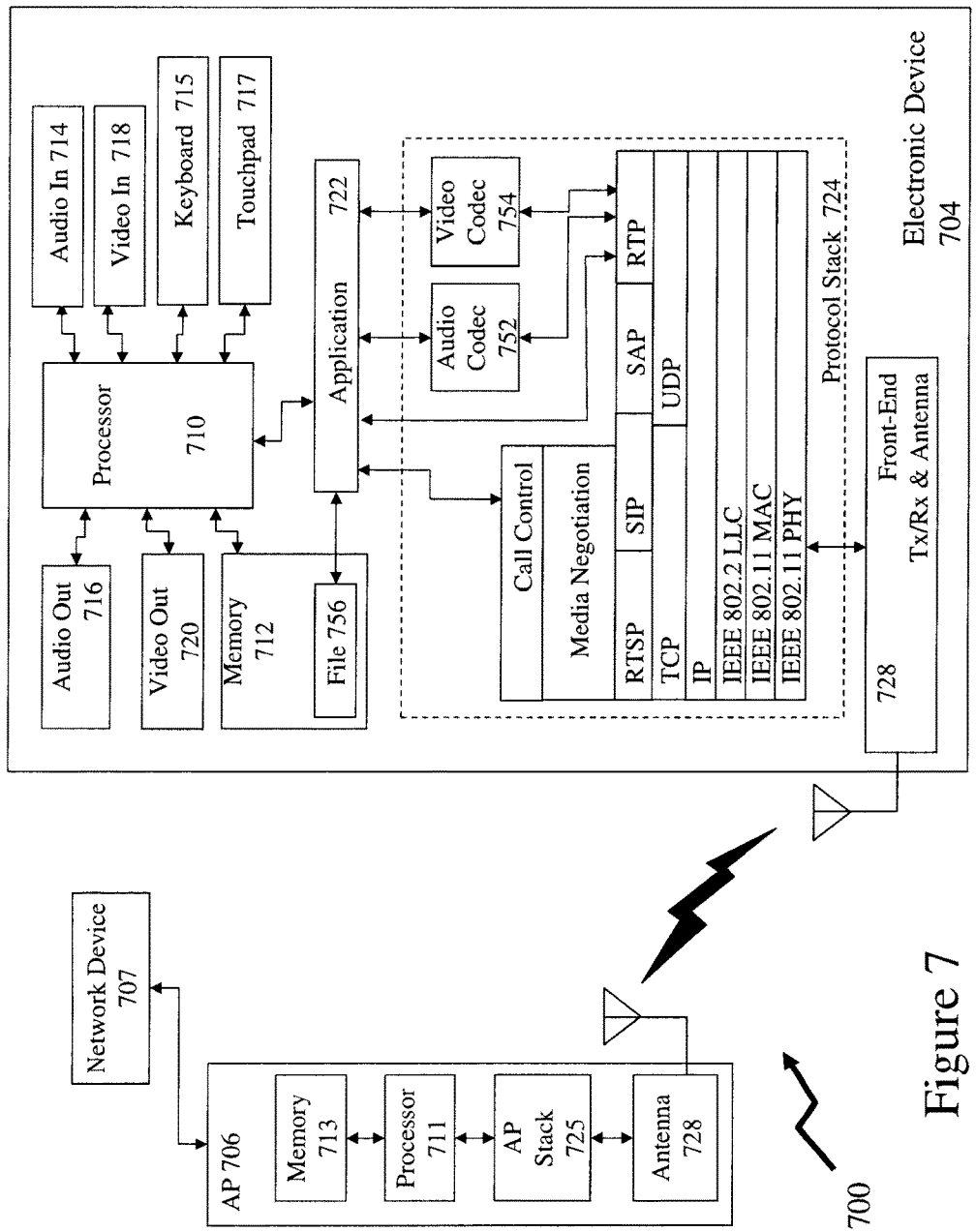
FIG. 7 depicts an electronic device supporting communications and interactions to the network depicted in FIG. 6.

Referring to FIG. 7 there is depicted an electronic device 704, supporting communications and interactions according to embodiments of the invention. Electronic device 704 may for example be a portable electronic device or a fixed electronic device and may include additional elements above and beyond those described and depicted. Also depicted within the electronic device 704 is the protocol architecture as part of a simplified functional diagram of a system 700 that includes an electronic device 704, such as a smartphone 655, an access point (AP) 706, such as first Wi-Fi AP 610, and one or more network devices 707, such as communication servers, streaming media servers, and routers for example such as first and second servers 175 and 185 respectively. Network devices 707 may be coupled to AP 706 via any combination of networks, wired, wireless and/or optical communication links such as discussed above in respect of FIG. 1. The electronic device 704 includes one or more processors 710 and a memory 712 coupled to processor(s) 710. AP 706 also includes one or more processors 711 and a memory 713 coupled to processor(s) 711.

Electronic device 704 may include an audio input 714, for example a microphone, and an audio output 716, for example, a speaker, coupled to any of processors 710. Electronic device 704 may include a video input 718, for example, a video camera, and a video output 720, for example an LCD display, coupled to any of processors 710. Electronic device 704 also includes a keyboard 715 and touchpad 717 which allow the user to enter content or select functions within one of more applications 722 that are typically stored in memory 712 and are executable by any combination of processors 710. Electronic device 704 includes a protocol stack 724 and AP 706 includes a communication stack 725. Within system 700 protocol stack 724 is shown as IEEE 802.11 protocol stack but alternatively may exploit other protocol stacks such as an Internet Engineering Task Force (IETF) multimedia protocol stack for example. Likewise AP stack 725 exploits a protocol stack but is not expanded for clarity. Elements of protocol stack 724 and AP stack 725 may be implemented in any combination of software, firmware and/or hardware. Protocol stack 724 includes an IEEE 802.11-compatible PHY module coupled to one or more Front-End Tx/Rx & Antenna 728 as well as IEEE 802.11-compatible MAC and LLC modules together with a network layer IP, transport layer User Datagram Protocol (UDP) module and transport layer Transmission Control Protocol (TCP) modules.

Protocol stack 724 also includes session layer Real Time Transport Protocol (RTP), Session Announcement Protocol (SAP), Session Initiation Protocol (SIP) and Real Time Streaming Protocol (RTSP) modules. Also shown are presentation layer media negotiation and call control modules together with one or more audio and video codecs 752 and 754 respectively. Applications 722 may be able to create maintain and/or terminate communication sessions with any of devices 707 by way of AP 706.

It would be apparent to one skilled in the art that elements of the electronic device 704 may also be implemented within the AP 706 including but not limited to one or more elements of the protocol stack 724.

Now referring to FIGS. 8A through 8C there are depicted first to third flowcharts 800A through 800C according to an embodiment of the invention relating to a SS-SA wherein a publisher publishes primary content which is subsequently purchased by an enterprise wherein a license and sub-licenses are issued and associated to the primary content. Within the descriptions of embodiments of the invention described with respect of FIGS. 6 through 21 there are described a SS-SA which provides an overall content delivery system and the security aspects surrounding the process are discussed. Amongst the desirable features of the distribution system are:

that can supply a fingerprinted version of the primary content for download;
minimal delay between request for primary and/or secondary content and the transfer of data;
no obvious transfer of keys between the system;
encryption of content may occur within the distribution server application;
methods for tracking user metrics;
no requirement for direct association between the users, clients and publishers as well as customers and the marketplace; and
no restrictions on membership to the software system and/or software.

Within embodiments of the invention reference may be made to the following:

CogniUser ID, a unique identifier for a user independent of licenses or sub-licenses issued to the user,
CogniSync, the server(s) synchronizing the primary and secondary content generated by publishers, users, etc and providing the merged/rendered content to the user(s); and
CogniStore, the server(s) providing the storage repository where primary and second content is stored and which may also be linked to "Market Place", Publisher and/or third party eStores such that these may simultaneously sell eBook "shells" wherein primary and/or secondary content is retrieved from the CogniStore in use.

Figure 8A:
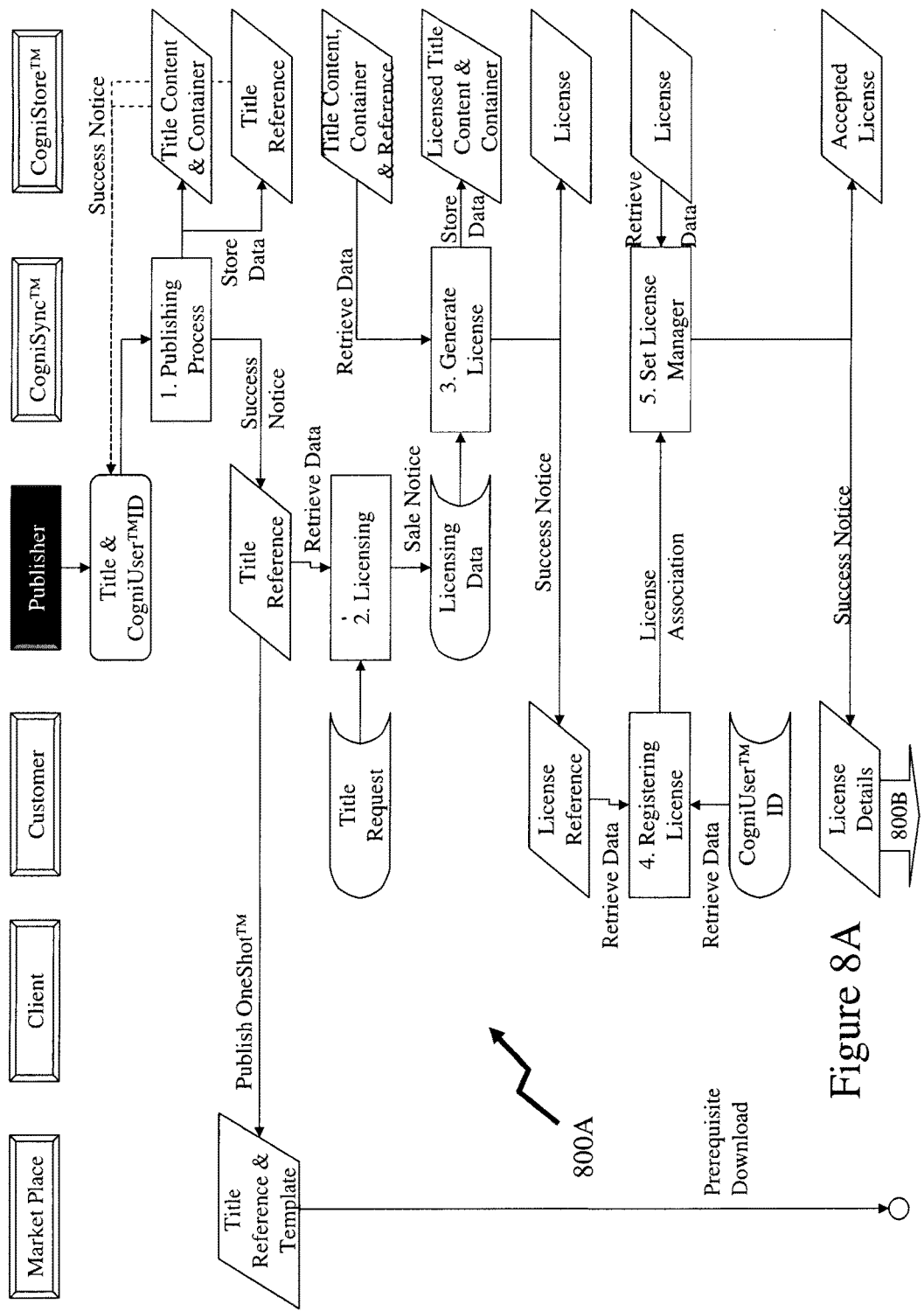
FIGS. 8A through 8C depicts a flowchart according to an embodiment of the invention relating to a SS-SA wherein a publisher publishes primary content which is subsequently purchased by an enterprise wherein a license and sub-licenses are issued and associated to the primary content.
Figure 8B:
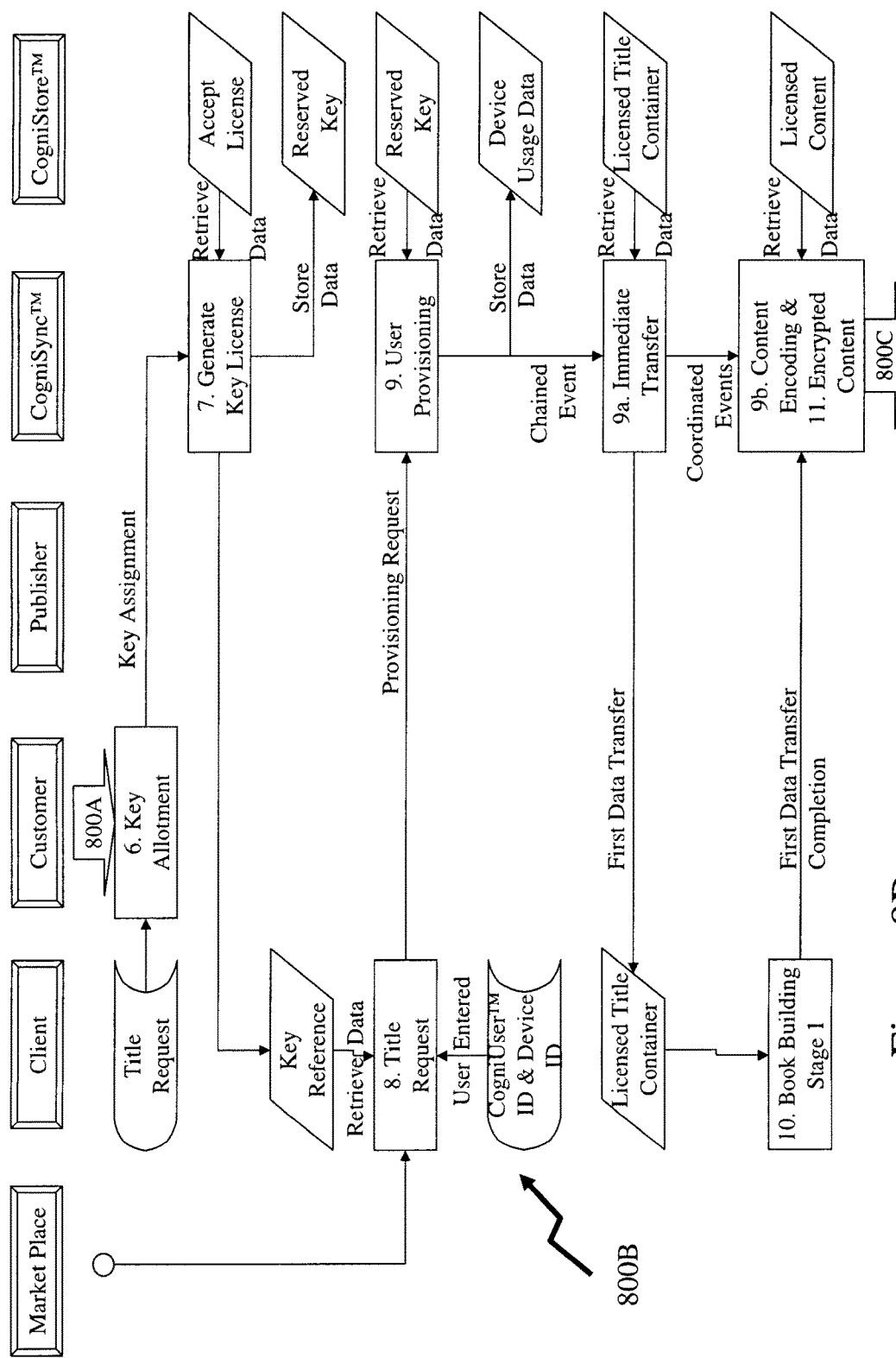
Figure 8C:
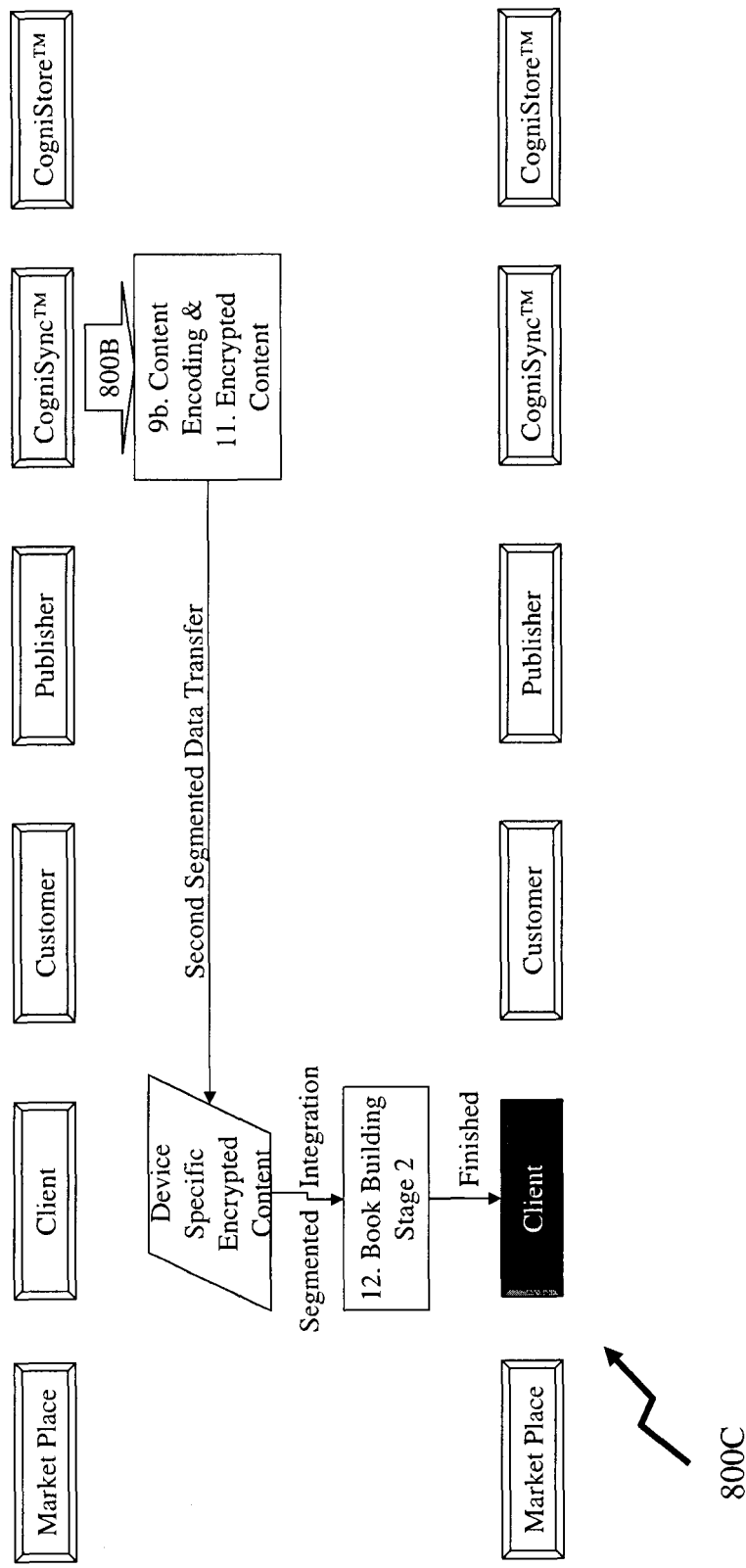

Accordingly, within FIGS. 8A through 8C the main process steps from initial release of a publication (primary content) by a publisher to downloading of the publication by the user (client) are presented. Within first flowchart 800A five steps are depicted, these being:

1. Publishing Process: wherein the Title is submitted to CogniSync™ using a valid CogniUser™ ID for that Publisher publishing the Title. During this stage the information is divided into four distinct parts and stored within appropriate locations on the servers of the software system. These being:
   i. Title Reference, which is generated and given to all locations;
   ii. Title Content, being the primary content is generated and stored on CogniStore™;
   iii. Title Container, is generated and stored on CogniStore™;
   iv. Title Template is packaged with the Title Reference and stored on the Market Place 2. Licensing: is performed or authorized using the Title Reference and a Title Request for a license set (which can consist of a single license) could take place through a number of mechanisms:
   1) based on an analog process, i.e. salesperson reports a sale back to the billing team, the publisher's representative accesses CogniSync through an interactive Dashboard and enters in all of the elements required to create a license, including the license set contact's e-mail address. CogniSync creates all of the necessary license set information and send a welcome message to the contact (curator).
   2) Similar to above, except based on the billing representative's entry of the sale, an automated process transmits required information to the CogniSync web service on a secure link (along with the publisher's ID and password information). CogniSync creates all of the necessary license set information and send a welcome message to the contact (curator)
   3) The sale is based on a digital process, i.e. a publisher or reseller's web store) which collects the necessary information. The webstore then triggers an automated process which transmits required information to the CogniSync web service on a secure link (along with the publishers' ID and password information). CogniSync creates all of the necessary license set information and send a welcome message to the contact (curator)

In all cases, the curator then uses a link and instructions within the message to assign the license. Accordingly, it would be evident to one skilled in the art that embodiments of the invention therefore support sales and licensing being issued by the publisher (e.g. Thomson Carswell, Academic Press, Random House, and HarperCollins), the SS-SA, or another third party (e.g. Amazon™, Chapters Indigo™, Barnes & Noble™).

3. Generate License: uses the Licensing Data in conjunction with the Title Content and Title Container to generate a customised version of the Title Content and Title Container that has fingerprinting embedded within both structures where the customization relates to one or more aspects of the Licensing Data. In some embodiments of the invention this part of the process may be transparent to both the user and the publisher by providing security through obfuscation, in others encryption, encoding and other obfuscation techniques are utilised. Generating the license additionally creates the License for internal tracking and an external License Reference. The external License Reference is then sent on behalf of the publisher to the Customer's specified email(s) used when registering their account and may be an individual user or an enterprise's curator for example.

4. Registering License: is the next step which taken by the Customer supplying CogniSync™ with the CogniUser™ ID of the Curator at the time of acceptance of the License, thereby accepting delivery of the content. There is a differentiation according to embodiments of the invention between a license set (which contains one or more licenses) and individual licenses (which are granted to a user) which may be considered in steps 4 through 7 inclusive.

When a sale takes place the curator contact, which may end up being the same person as the user, receives an e-mail from the CogniSync system with instructions, a link to the CogniSync Dashboard, namely the control panel for a content management system, and a license set key (between steps 3 and 4). The curator contact then uses this information to accept the license set and associate it with their CogniID (step 4). If necessary, they setup a new CogniID, along with their organization during this process of which they are granted "Curator" status for that organization wherein account consolidation tools may be provided (step 5). They can now assign the license(s) to users that they create through the Dashboard, they are automatically the first user, ensuring that the user's contact information is indicated (step 6). At this point in time, the CogniID information for the user's is not shown, it is not populated (and may not exist) until the user accepts the license between steps 7 & 8.

5. Set License Manager: is the following process in which CogniSync™ officially enables the License to the Curator recording the association, and allowing the Publisher to track delivery as the Accepted License.

Within second flowchart 800B a further five steps are depicted, these being:

6. Key Allotment: is the next step for a Curator who has successfully received the License Details to assign Client access to the Title. The Customer Curator supplying the Client must then register the Key Assignment with CogniServ™. Within the specification and description where License Details are referenced that this may be associated with a License Set and that a Key may be associated with a License.

7. Generate Key Reference: is the software system process, for example as operated by CogniLore Inc., in which the Key is associated with the Customer's Accepted License and the use of the Key is stored as a Reserved Key. Additionally, the Key Reference is sent on behalf of the Customer to the Client's identified email account(s).

8. Title Request: is the stage where the Key Reference is used by the Client who has already retrieved from the appropriate Market Place the Title Reference and its associate Title Template, who can then contact CogniSync™ using the Title Template which will supply the Device ID and then require the user to supply a CogniUser™ ID. For clarity, the Key may not be entered through the software but may be entered through the CogniSync Dashboard. An e-mail may be sent by the CogniSync system to the user containing instructions, a link to the CogniSync Dashboard, and their Key Reference. The title is accepted through the CogniSync Dashboard, and not from within the software.

Upon completion of this stage User Provisioning can Start

9. User Provisioning: starts with the confirmation of the Reserved Key and stores the Device Usage for later use and then two sub-processes are started.
   A. Immediate Transfer: is used so that the user is presented with low delay or wait period in accessing initial content; and
   B. Content Encoding: requires the Device ID so that the encryption key can be derived and begins queuing data for transmission in process in step 11 Encrypted Content Transmission.

10. Book Building Stage 1: where the Title Template integrates the License and Title Container into itself and then reports back to CogniSync™ that it is ready to receive the Encrypted Content.

Within third flowchart 800C a further two steps are depicted, these being:

11. Encrypted Content Transmission, which is performed in conjunction with continuation of 9B Content Encoding: as the title of this process implies there is both an active Encoding process going on as well as the transmission of parts as they are completed. This allows embodiments of the invention to exploit a buffering process and ensure that there is a constant flow of data and perceivable progress to the user.

12. Book Building State 2: wherein individual Device Specific Encrypted content is added to the Content Template eventually completing the entire process and providing the Client with the completed Title ready for use.

As described within respect to embodiments of the invention the primary and secondary content are provided to the user in a manner supporting the scrolling of the combined content by the user such that unlike other prior art applications the discontinuity in scrolling is minimized as the content retrieved and rendered is adjusted according to the actions of the user. Accordingly, such embodiments generally comprise the primary content remaining at the software system servers and a predetermined portion of the merged primary and secondary content being provided to the user such as described below in respect of FIG. 12 and then removed upon the user closing the selected title. Such an approach supporting, for example, reduced memory requirements for devices the user uses to access the content, provide flexibility in users accessing the content from any electronic device, and reduction in the content released as complete copies of the primary content are not released. It would be evident to one skilled in the art that alternatively the complete primary content may be provided to the user and accordingly the user license for a particular primary content is a predetermined limited number of licenses tied to particular electronic devices, i.e. in a manner similar to that employed in Apple iTunes™.

It would also be evident to one skilled in the art that the licensing approach described in respect of FIGS. 8A through 8C allows a curator to purchase multiple licenses for an enterprise, for example a law firm, and then assign licenses to lawyers, administration staff etc. The curator may then terminate licenses and/or re-assign them to other lawyers, administration staff in dependence upon staff changes, requirements etc. Further, as the SS-SA tracks the usage of the users against the licenses it provides the curator with increased metrics with which to manage the licenses required within their enterprise and accordingly their budget plus provide justification for the licenses purchased through usage data. It would also be evident to one skilled in the art that licenses may also be established according to embodiments of the invention for either full or partial primary content with or without published secondary content with predetermined limited validity so that a curator may adjust licenses to reflect short-term requirements and/or license primary content to address particular requirements of the enterprise.

It would be apparent to one skilled in the art that according to an embodiment of the invention this simplified delivery of a title to a single user shows that they act as both curator and user. From their perspective the process flow may be perceived as:

I receive an e-mail from the CogniSync server announcing my new purchase, which contains a license set key, a link to the CogniSync Dashboard, and instructions;

I click on the link to access the CogniSync Dashboard;

I login to my CogniID account, or create a new CogniID account;

I click on the register new license within the CogniSync Dashboard and enter my license set key. This activates the license set, the details of which I can now see within the CogniSync Dashboard in an area titled "My License Sets", and am prompted if I want to associate a license key with my CogniID;

I click on "Yes" and the relationship is made;

The purchased Title now appears under another area entitled "My Titles", along with the Title restrictions. Clicking on the Title loads additional information relating to the Title. I al also provided instructions on how to acquire the software, for example single user or library version, to download the title to the various devices;

I can now assign the other keys purchased (if any) to other users via the "My License Sets" interface, entering their e-mail contact information. The users are added to a list, which also includes their status (which is Pending until it has been claimed) and their CogniID (which is blank until populated when claimed);

When each assignment of the key is confirmed, a user welcome e-mail is sent to the user with instructions, a link to the CogniSync Dashboard, and their License Key. The user accesses the CogniSync Dashboard as above, and enters the License Key. This activates the product for them under "My Titles". The site now provides them with information on downloading the software.

It would also be evident to one skilled in the art that embodiments of the invention with respect to licensing content, issuing sub-licenses, and re-assigning licenses may be applied to alternate forms of content other than those primarily considered within this specification for electronic publications. As the primary content may be any multimedia content then the licensing of content, issuing sub-licenses, re-assigning licenses, etc may be applied to audio content, audiovisual content, and multimedia content. Examples of such content including for example music, films, videos, computer generated graphics, animation, computer generated animation, and games.

Figure 17:
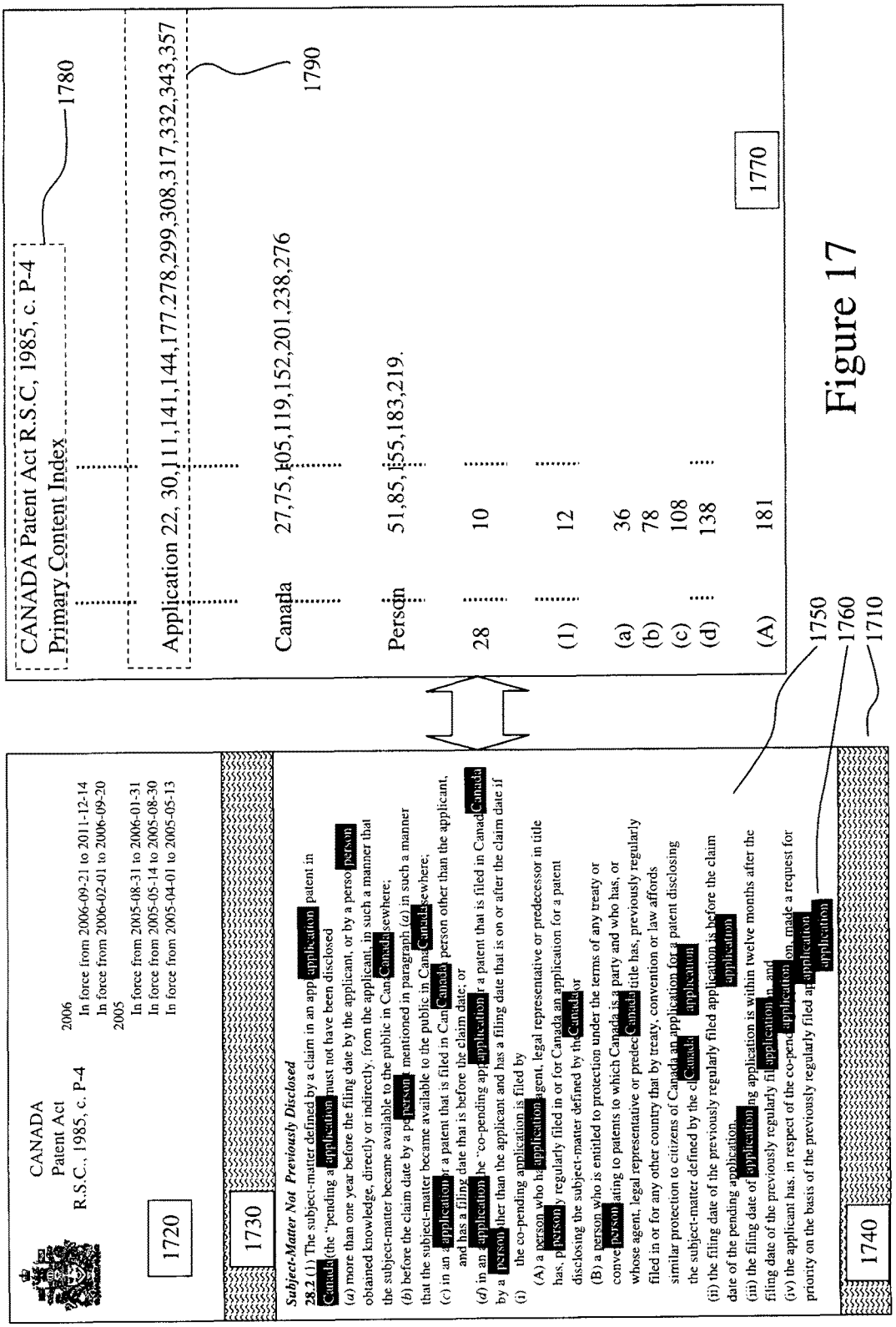
FIG. 17 depicts an indexing of primary content according to an embodiment of the invention.

Alternatively, the encryption described in respect of content transmittal within FIG. 17 may be implemented through different protocols including for example, exploiting Hypertext Transfer Protocol Secure (HTTPS) to encrypt automatically content data being transmitted from CogniSync™ to the Client and encrypting this content data on the Client's device automatically with the reader software upon receipt so that the content is encrypted on the Client's device. Optionally, containers for data transmission, such as Licensed Title Container may be generated dynamically rather than being stored within CogniStore™ Optionally, the DeviceID rather than being employed to lock the Title to a specific device may be used for analytics.

Figure 8D:
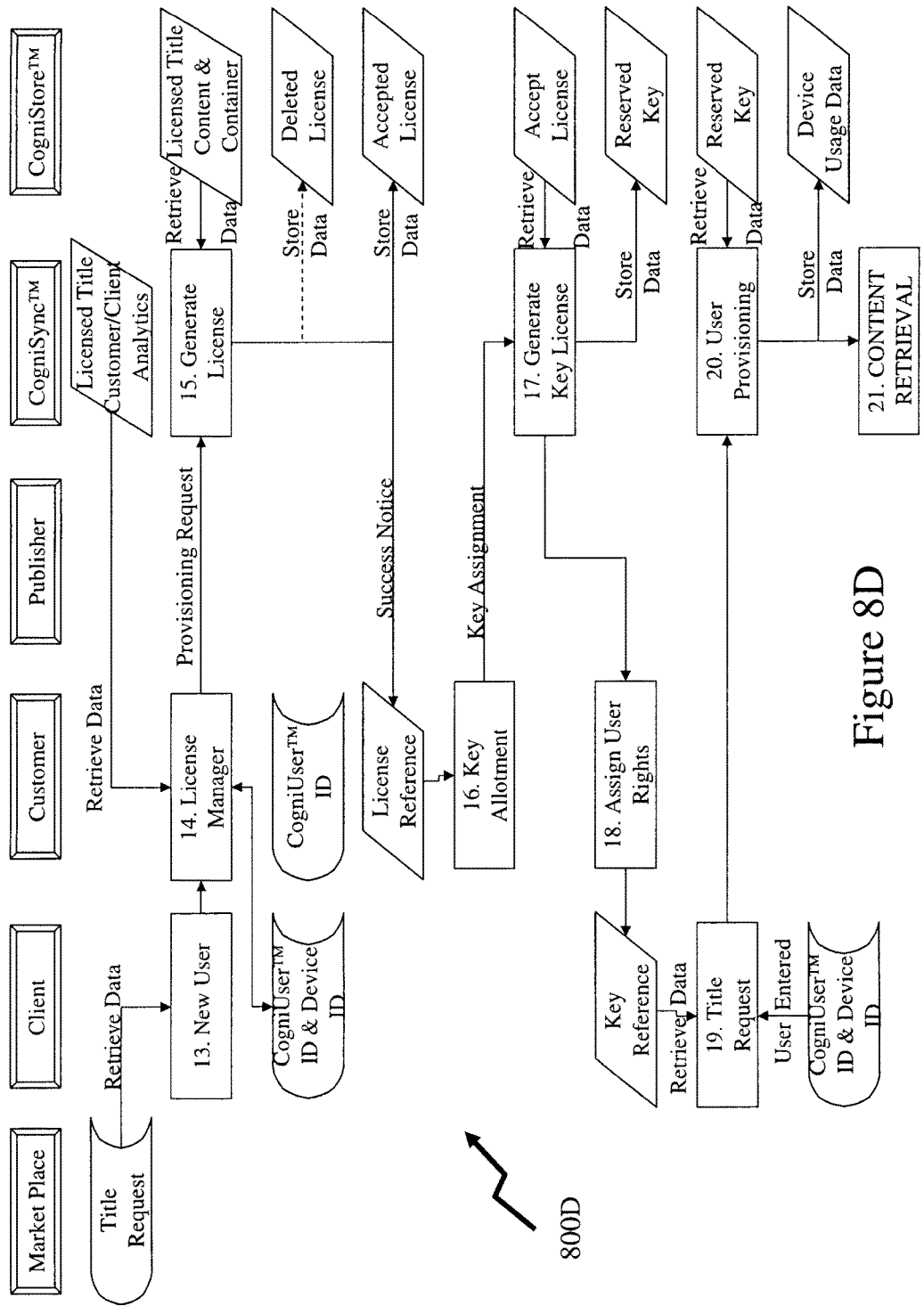
FIG. 8D depicts a flowchart according to an embodiment of the invention relating to a SS-SA wherein a customer converts an existing license from one user to another through the SS-SA.

Referring to FIG. 8D there is depicted a flowchart 800D according to an embodiment of the invention relating to a SS-SA wherein a customer converts an existing license from one user to another through the SS-SA. Within flowchart 800D 9 steps are depicted together with their associated elements to/from each level of Market Place, Client, Customer, Publisher, CogniSync™, and CogniStore™:

13. New User: where a new user has searched a market place or multiple market places wherein they have identified a Title which they are interested in accessing. Such market places include for example publisher websites, e.g. HarperCollins and Penguin; aggregators, e.g. Amazon, Kobo, and iTunes; and the software system provider. Accordingly, the new user communicates this information to the curator, referred to in the flowchart 1800D as "License Manager." Within this embodiment of the invention the new user engages the curator who manages titles through a library version of the software. As described elsewhere within the specification the new user may also purchase titles directly through a single user interface.

14. License Manager: accesses the software application based upon their CogniUser™ identity information and retrieves from the CogniSync™ servers customer and client analytic data relating to the Title indicated by the new user. The License Manager also retrieves data relating to the new user, including, for example, but not limited to CogniUser™ identity and device identity. If the customer/client analytic data indicates that a license or licenses already exist with other users within the organization then the License Manager is able to determine the degree to which these copies of the title are utilized. Accordingly, the License Manager is able to determine a course of action which may include, but is not limited to, purchasing a new license, cancelling a license assigned to another user at the organization, securing a partial license to the title, and refusing the request based upon historical data relating to the new user's use of licenses. Based upon the determined action the License Manager may send a provisioning request to the CogniSync™ servers.

15. Generate Key License: based upon the provisioning request received from the License Manager the CogniSync™ servers hosting the software system the system retrieves data relating to the title content and title container and determines an action or actions, including, but not limited to, generating a new license, deleting an existing license, and amending the data associated with an existing license. Where a license is issued or amended then the License Manager is notified together with being provided with a licenses reference.

16. Key Allotment: where for the License Manager who has successfully received the License Details for the new or modified license relating to the Title now registers for Key Assignment with CogniServ™.

17. Generate Key License: where the software system process, for example as operated by CogniLore Inc., generates a new Key to be associated with the Customer's Accepted License and the use of the Key is stored as a Reserved Key. Additionally the Key Reference is sent to the Customer's identified email account(s) for subsequent forwarding to the customer with associated details the License Manager provides to users such as organization policies and limits of issued license for example.

18. Assign User Rights: where the Key Reference is used by the Customer is forwarded to the Client so that they can then contact CogniSync™ using the Title Template which will supply the Device ID and then require the user to supply a CogniUser™ ID. Upon completion of this stage User Provisioning can Start.

19. Title Request: where the user now accesses the CogniSync™ system and the software application on their electronic device transfers their key reference, CogniUser™ ID, and Device ID authorizing the CogniSync™ system to provision the user for subsequent transmittal of content.

20. User Provisioning: starts with the confirmation of the Reserved Key and stores the Device Usage for later use and then two sub-processes are started.
  A. Immediate Transfer: is used so that the user is presented with low delay or wait period in accessing initial content; and
  B. Content Encoding: requires the Device ID and Reserved Key so that the encryption key can be derived and begins queuing data for transmission in process in step 11 Encrypted Content Transmission.
21. Content Retrieval: wherein the CogniSync™ system retrieves the first elements of primary content together with any secondary content relating to access rights of the new user, such as for example project, team, and organization together with public secondary content.

Figure 8E:
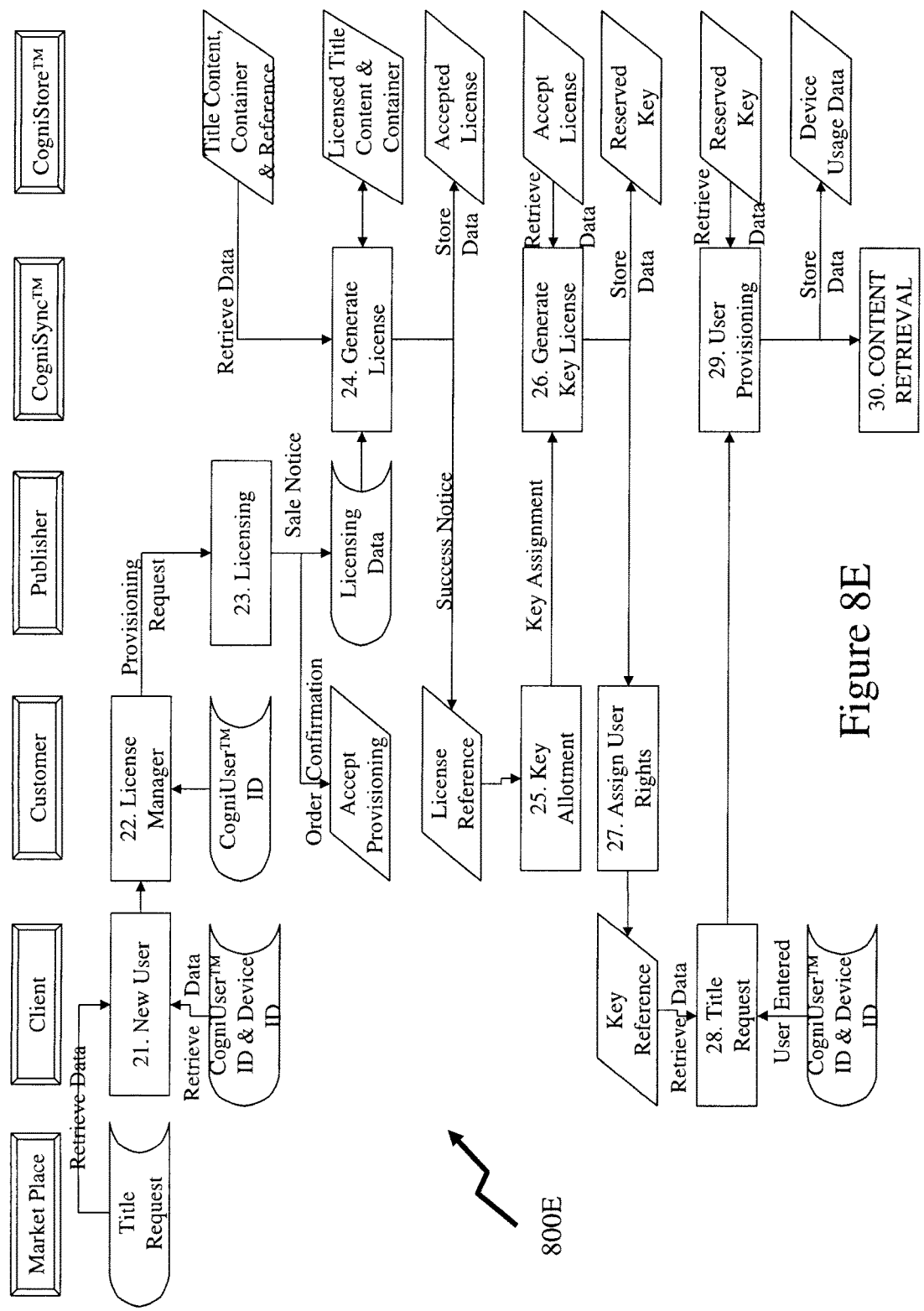
FIG. 8E depicts a flowchart according to an embodiment of the invention relating to a SS-SA wherein a customer adds a new license to a title through a publisher as opposed to through the SS-SA provider.

Now referring to FIG. 8E there is depicted a flowchart 800D according to an embodiment of the invention relating to a SS-SA wherein a customer adds a new license to a title through a publisher as opposed to through the SS-SA provider. As depicted flowchart 800D comprises 10 steps together with their associated elements to/from each level of Market Place, Client, Customer, Publisher, CogniSync™, and CogniStore™. These being:

22. New User:
23. License Manager:
24. Licensing:
25. Generate License:
26. Key Allotment:
27. Generate Key License:
28. Assign User Rights:
29. Title Request:
30. User Provisioning:
31. Content Retrieval.

Steps 22 through 24, and 26 through 31 being comparable to steps 13 through 21 respectively as described supra in respect of FIGS. 8A through 8D respectively. Step 24 as executed by the Publisher comprises receiving the provisioning request from the Customer, authorizing the Customer's purchase, thereby generating a sale notice which forms part of the licensing data transmitted to the CogniSync™ system and an order confirmation to the Customer as acceptance provisioning.

It would be evident to one skilled in the art that the License Manager provisioning request may, as with multiple steps in the process flows described in respect of FIGS. 8A through 8E respectively be delayed in time with respect of the preceding steps(s), in this instance the request from the new user in respect of the Title. Such delays may be of varying duration from very short to quite long. For example, a library may absorb multiple requests for titles from users within a large organization or the general public and collate/review these prior to making purchases.

It would be evident to one skilled in the art that the License Manager as described in respect of embodiments of the invention in FIGS. 8A through 8E may re-assign licenses relating to titles. Accordingly, it would be evident that as each licensed user only retrieves those portions of the content relating to their current view, and that this is encrypted and fingerprinted as described below in respect of FIGS. 10 and 11, that each licensed user does not receive the content in a single download, such as occurs with prior art market places such as iTunes, Kobo, Kindle, etc. Further, as termination of rights for a user, such as end of a predetermined loan period for example, the user cannot access the Title with their existing key and license. Further as all requests, provisioning, key transfers, license transfers occur electronically and associate device identity information it would be evident that users may request a Title remote from the library which would have pre-registered the user.

It would also be evident to one skilled in the art that the preceding description in respect of FIGS. 8A through 8E is described with respect to a single title publishing solution. However, it would be evident that the method described above in respect of FIGS. 8A through 8E also relates to a SS-SA managing a library of titles for at least one of a publisher, a retailer, a curator, and a user. Accordingly, for example, a publisher may provide multiple titles which are published and some of which are purchased with single licenses and others with multiple licenses. Likewise a curator may manage multiple titles some of which are purchased with single licenses and others with multiple licenses or a user may purchase licenses themselves, therefore making themselves a curator for that title, as well as being allocated licenses for other titles from a curator. Hence, the SS-SA may include support for a library interface.

For example, according to an embodiment of the invention, a software package is posted to a distributing marketplace for an appropriate platform, for example Apple Application Store for the Apple iOS operating system, Android Marketplace for Google's Android operating system, and Publisher website for Microsoft Windows. The software package contains an application and an e-book title shell. When launched, the software requests the user's CogniID information and then checks to see if they have been granted access to the associated title. Upon validation of the user access rights the e-book title shell is populated with the predetermined contents which may, for example, be the entire e-book or the first chapter of the e-book.

According to another embodiment of the invention, a software application for library is purchased from a software provider directly or through a distributor such as one of the marketplaces listed above, and installed to a device. The library software then requests the user's CogniID information and checks to see which there are titles that they have access to. Optionally a list of titles may be presented to the user allowing them to determine which ones should be downloaded to a particular device, with a function existing within options to retrieve and update this list. The software application then downloads the e-book title shell for each, or each selected, title, and then sequentially populates the title shell(s) with the predetermined portion of the e-book contents determined for e-book.

According to another embodiment of the invention the software system and/or software there is a "blind forward" and no owner relationship between the Client (User) and Customer. Within another scenario the Customer (Curator) would review the licenses and would make a change in the license assignment, including the contact information (e-mail). This would both cancel the first license, which would remove the title from the first licensee on the next product access to CogniSync, the details of which would be available to them in their 'My Titles' section of the CogniSync Dashboard, and would send a welcome message to the new user with links and instructions such as described above wherein they would procure the software, setup/login to their CogniID account, register their product via the CogniSync Dashboard etc as described above. If, the user already had access to a particular title, the CogniSync Dashboard would present them with a set of options, including for example accepting the new title assignment which would break the existing license relationship and notifying the curator of the current title that a license has been freed, and rejecting the new title assignment and notify the assigning curator that the title assignment was rejected.

Figure 9:
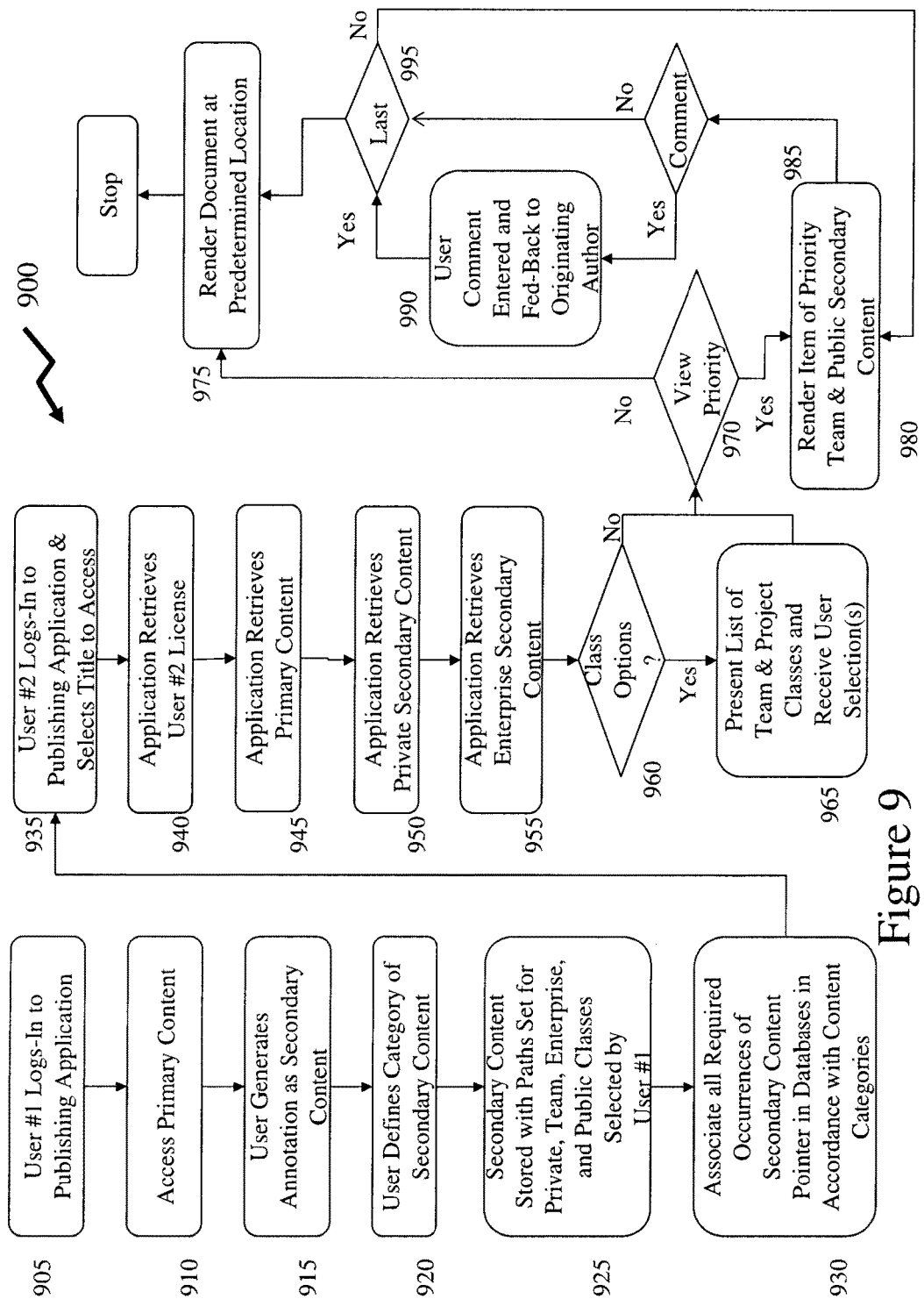
FIG. 9 depicts a flowchart according to an embodiment of the invention relating to a SS-SA wherein secondary content generated by a user in association with primary content may be associated with different levels of publication by the user and subsequently is rendered to another user based upon their license and access rights.

Now referring to FIG. 9 there is depicted a flowchart 900 according to an embodiment of the invention relating to a SS-SA wherein secondary content generated by a user in association with primary content may be associated with different levels of publication by the user and subsequently is rendered to another user based upon their license and access rights. Accordingly the process begins at step 905 wherein the user logs-in to the software system and/or software application, accesses an item of primary content in step 910 and generates an item of secondary content in step 915. Next in step 920 the user is prompted to select a category of available categories to which to assign the secondary content as. As depicted in flowchart 900 these content categories are "Private", "Team", "Enterprise", and "Public." Based upon the decision of the user then the process proceeds to step 925 wherein the required associations of the secondary content to the appropriate content indices are made and the process proceeds to a content merging processes before proceeding to step 930 where, based upon the content categories, all required occurrences of a secondary content pointer in the databases associated with the content categories "Private", "Team", "Enterprise", and "Public." In this manner a first user generating an annotation to a Title within "Team" category of association results in pointers to the annotation being generated and stored rather than repetitions of the annotation made to multiple databases. For example, the "Team" database may therefore comprise locations of annotations and their respective generating users so that the annotations may be retrieved from the "Private" databases of the generating users rather than requiring these to be all inserted to a separate database of "Team" annotations to the Title. Where multiple annotations within a small region of the Title exist then these database entries may then provide the means for filtering based upon user input. Optionally, these annotations may be stored at least one of offline in remote servers, stored offline in local servers, or stored locally.

It would be evident that the user may select two or more categories in process step 925 such as for example "Team" and "Project" so that other members of the user's team can see the secondary content relating to a specific aspect of the "Project." Additionally, electing two categories allows such content to be available to the user when, in this example, the "Project" terminates and the curator removes that access to the users forming the project team. From step 930 the process proceeds to step 935 wherein a second user, User 2, logs-in to the software application and/or software system and selects the primary content, namely the Title, which they wish to access. The SS-SA then retrieves in step 940 the license information relating to the second user. In step 945 the primary content to which the second user is licensed, as this may be a license to part of a Title as opposed to the whole Title, is accessed and depending upon whether a preceding session of the second user exists the primary content is either retrieved from a predetermined location within the Title or from the last point of the second user's last session according to the preferences of the second user.

In step 950 the SS-SA retrieves the private secondary content of the user associated with the primary content before proceeding to step 955 to retrieve enterprise secondary content according to the licensing rights established for the user such as discussed above in respect of FIGS. 8A through 8E respectively above and FIG. 13 below. As discussed secondary content may be allocate to one or more classes of a plurality of classes such as private, team, project, enterprise, and public for example or alternatively being published with different rights requirements of the user to access.

Due to an enterprise requiring a user to be part of multiple teams and/or projects the second user is prompted within step 960 by the software application and/or software system, where the retrieved secondary content has multiple classes, as to whether they wish to refine the secondary content which will be rendered with the primary content. If not the process moves to step 970 wherein the process determines whether there is priority content that has not been previously viewed by the user and prompts the user as to whether they wish to view this priority content or not. If the user elects to apply a filter on the secondary content then the process moves to step 965 wherein the software application and/or software system presents the user with a list of classes relating to the secondary content and receives their selection before proceeding to step 970.

In step 970 the user determines whether to view this priority content or not, where if not the process proceeds to step 975 and the primary and secondary content are merged and rendered to the user. If the user determines to view priority secondary content then the process moves to step 980 wherein an item of primary content and its associated priority secondary content are merged and rendered to the user and the process moves to step 985. At this point the user may comment on the priority annotation or not, if not the process proceeds to step 995 to determine whether additional items of priority secondary content remain to be presented to the user. If the user determines to add a comment then the process moves to step 990 wherein the user adds any comments that they wish to make which are then processed by the SS-SA such that they are fed back to the author and added as secondary content extension to the priority secondary content wherein the process moves to step 995.

If remaining priority secondary content remains the process returns to step 980 otherwise it proceeds to step 975 wherein the primary and secondary content are merged and rendered to the user and the process stops. It would be evident to one skilled in the art that user actions in respect of the secondary content may be logged as part of the monitoring activities of the SS-SA. Accordingly where the user elects not to view priority secondary content that this decision is stored as are any activities with respect to secondary content. It would be evident to one skilled in the art that at process step 975 where the primary and secondary content are merged, rendered and presented to the user that this may be performed in accordance with settings of the SS-SA which are either the default settings of the system, those of the publisher in relation to the primary content, or those established by the user. For example retrieving "War and Peace" may result in the content being retrieved and rendered to place the user as the location they previously stopped at whereas accessing "Consolidated Intellectual Property Statutes and Regulations with Related Materials 2012" may place the user at the table of contents.

Optionally, the user may be presented with information relating to priority annotations upon entering the software system and/or software application rather than specifically accessing the primary content to which they relate. Accordingly, the user may be presented with those titles to which they have licenses that have new priority annotations together with information such as quantity it etc. A user may then access the secondary content relating to one or more primary content sources in isolation of retrieving each primary content source as well as performing other functions such as flagging all priority annotations as read etc. It would also be evident that some priority annotations may be established as very high priority, for example, such that the user cannot flag these as read or otherwise without actually opening them. The ability to create such very high priority annotations may be restricted to specific users and/or curator.

It would also be evident to one skilled in the art that the second user may also be prompted as to whether they wish to source public annotations in addition to the private, team, project, and enterprise class annotations. Accordingly, based upon the number of classes the user may elect to filter different combinations of these based upon their activity. It would also be evident that for each class or for a combined sub-set of the plurality of classes that the second user may also apply secondary filters. This may be automatically presented to the user or be accessed through an "Advanced" feature in a preceding menu option or be settable as a user preference within the software application and/or software system rather than requiring it be defined each time the user accesses a new Title.

Figure 10:
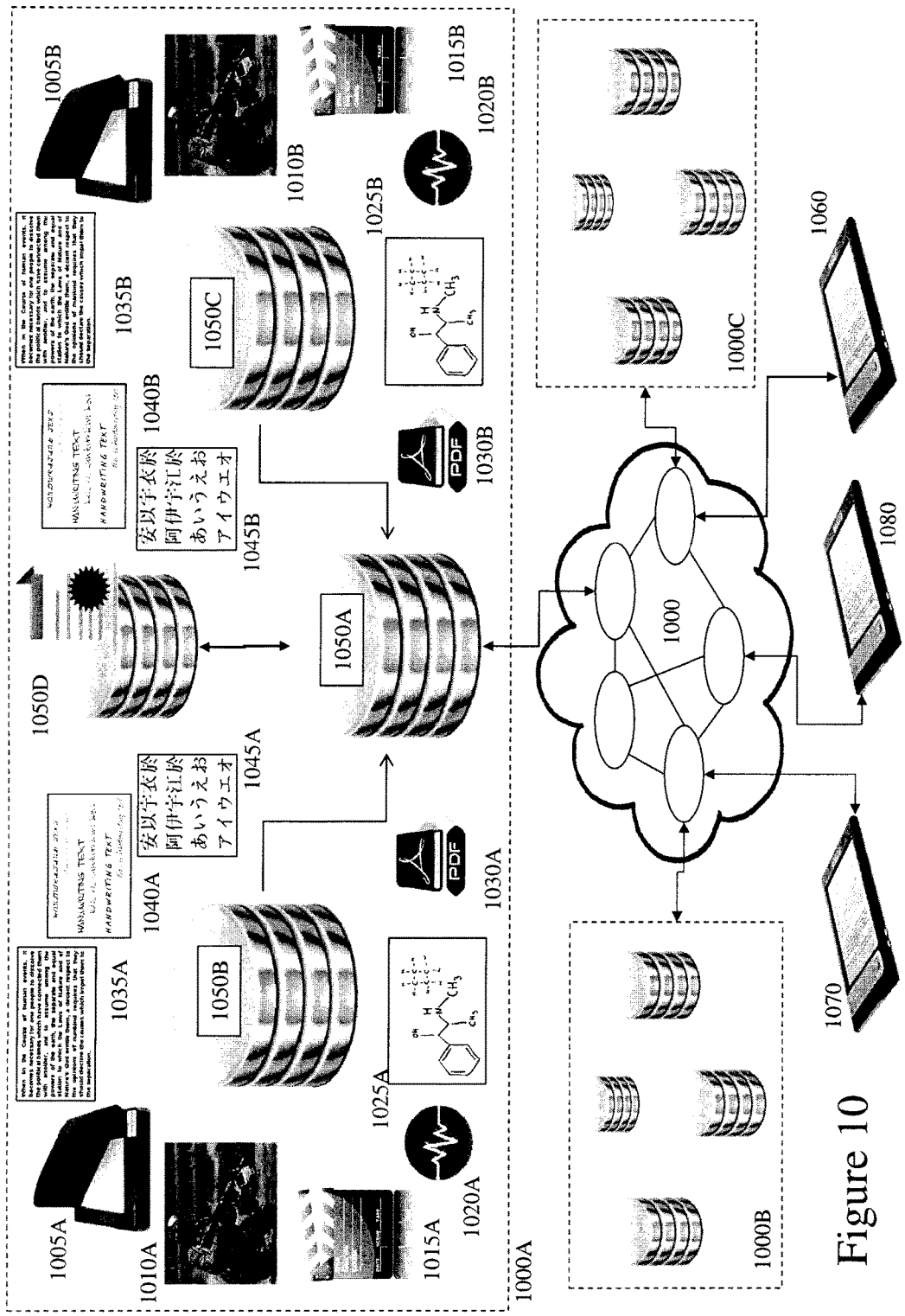
FIG. 10 depicts a schematic according to an embodiment of the invention relating to a SS-SA relating to the rendering of merged primary and secondary content to a user with multiple software systems.

Referring to FIG. 10 there is depicted a schematic according to an embodiment of the invention relating to a SS-SA providing the CogniStore™ functions of storing, retrieving, merging, and rendering primary and secondary content to a user with multiple software systems. As depicted a first server cluster 1000A comprises primary server 1050B, secondary server 1050C, licensing server 1050C, and first software system server 1050A. Primary server 1050B stores the Titles, primary content, released by publishers and stored within the server systems of the software system provider which may of any format including scanned images 1005A, computer generated images 1010A, video 1015A, audio signals 1020A, hand drawn content 1025A, PDF's 1030, text 1035A, hand written text 1040A, and non-Indo European languages 1045A. Similarly, secondary server 1050C stores the secondary content generated by users in association with the primary content. Such secondary content may be of any format including scanned images 1005B, computer generated images 1010B, video 1015B, audio signals 1020B, hand drawn content 1025B, PDF's 1030, text 1035B, hand written text 1040B, and non-Indo European languages 1045B. Accordingly, primary content of a Title and the secondary content may be of arbitrary multimedia content generated by the user of acquired from other sources including the Internet.

The primary content and secondary content stored upon the primary and secondary servers 1050B and 1050C respectively is direct to and retrieved from the software system in execution on the first software system server 1050A under the direction of the software system. The software system also directs to and retrieves from licensing data from the licensing server 1050D. First software system server 1050A is connected to a network 1000 to which are connected first to third electronic devices 1060 to 1080 respectively. Also connected to the network 1000 are second and third software system servers 1050B and 1050C respectively which provide geographically distributed server clusters receiving, storing, and retrieving primary and secondary content to the first and third electronic devices 1060 to 1080 which are executing the software application upon them.

Figure 11:
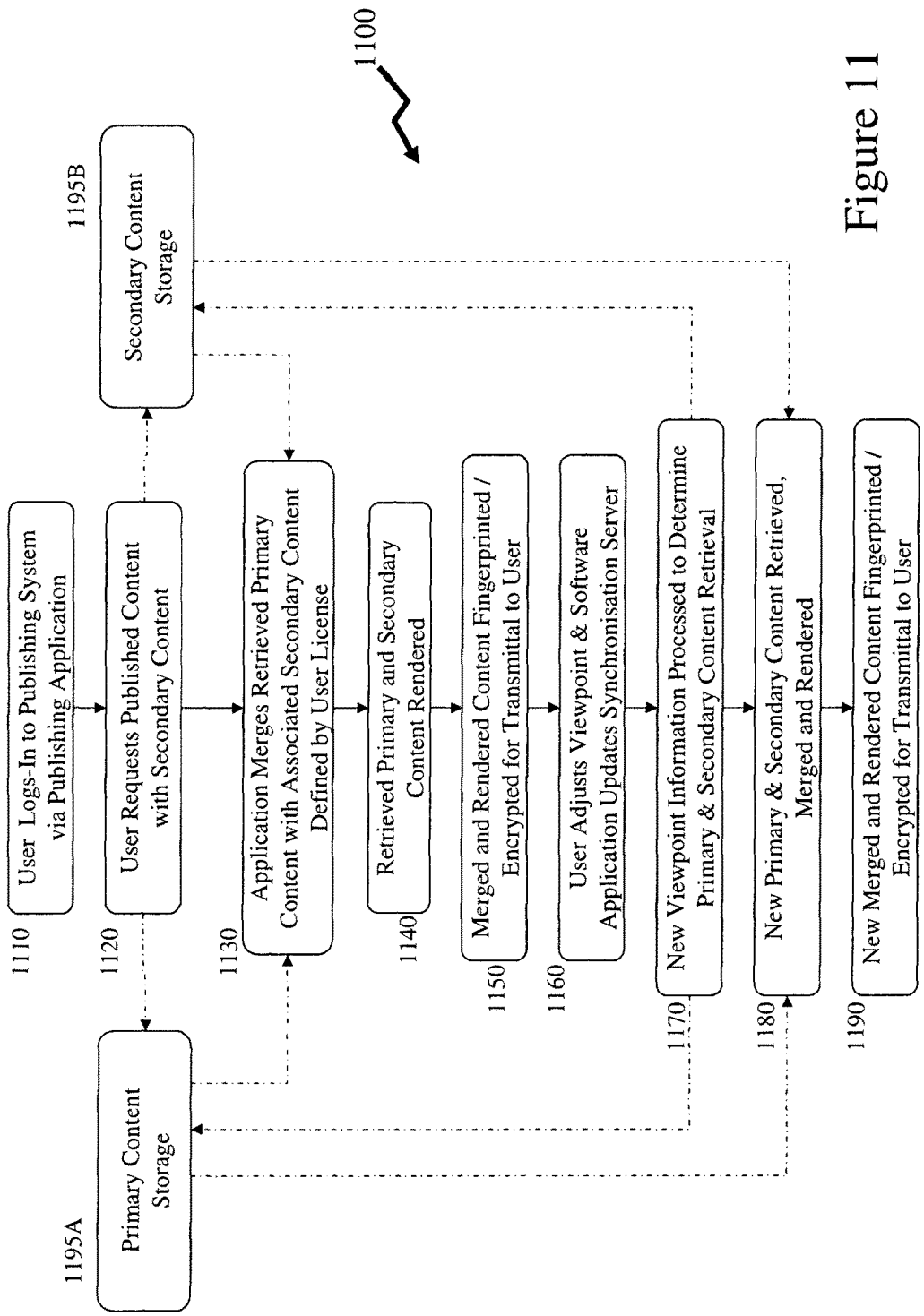
FIG. 11 depicts a flowchart according to an embodiment of the invention relating to a SS-SA executing the rendering of merged primary and secondary content to a user as outlined in FIG. 10.

Now referring to FIG. 11 there is depicted a flowchart 1100 according to an embodiment of the invention relating to a SS-SA executing the rendering of merged primary and secondary content to a user as outlined in FIG. 10. Accordingly the process begins at step 1110 wherein a user logs-in to the software system via a software application in execution upon an electronic device they are using and then requests a Title in step 1120 wherein the software system retrieves content from the primary content storage 1195A, such as primary server 1050B in FIG. 10, and secondary content storage 1195B, such as secondary server 1050C in FIG. 10. As discussed within the specification the primary content retrieved is filtered based upon the user license and the secondary content is filtered based upon both the user license and user settings relating to classes of secondary content etc. This retrieved content is merged in step 1130 and is then rendered for subsequent transmission in step 1140 wherein in step 1150 it is fingerprinted, encrypted, and transmitted to the user's electronic device. The software application upon the user's electronic device receives the rendered, fingerprinted, and encrypted content and then decrypts it, stores it, and presents it to the user allowing the user to view the primary and secondary content plus add new annotations, filter annotations, turn annotations on/off, search etc. Discussion of the fingerprinting and encrypting of content is discussed below in respect of FIG. 12.

Next in step 1160 the user elects to change their location (viewpoint) in the Title, such as depicted below in respect of FIG. 12 which triggers transmittal of new viewpoint information to be transmitted from the software application to the software system in order for the software system to determine what additional primary and secondary content should be retrieved from the primary content storage 1195A and secondary content storage 1195B respectively. Accordingly the additional retrieved primary and secondary content is merged and rendered in step 1180 wherein it is fingerprinted, encrypted and transmitted to the user's electronic device. It would be evident to one skilled in the art that the process steps 1160 through 1190 would be repeated as the user browses, reads, or moves through the Title.

It would also be evident to one skilled in the art that the steps of transmitting new view information, retrieval, merging, rendering, fingerprinting, encrypting and transmitting the new content would be performed where the user whilst accessing a Title makes another selection or adjustment to their preferences. Such preferences including for example but not limited to adjusting team, project, enterprise, public filter settings for secondary content, adding new secondary content, and searching.

Figure 12:
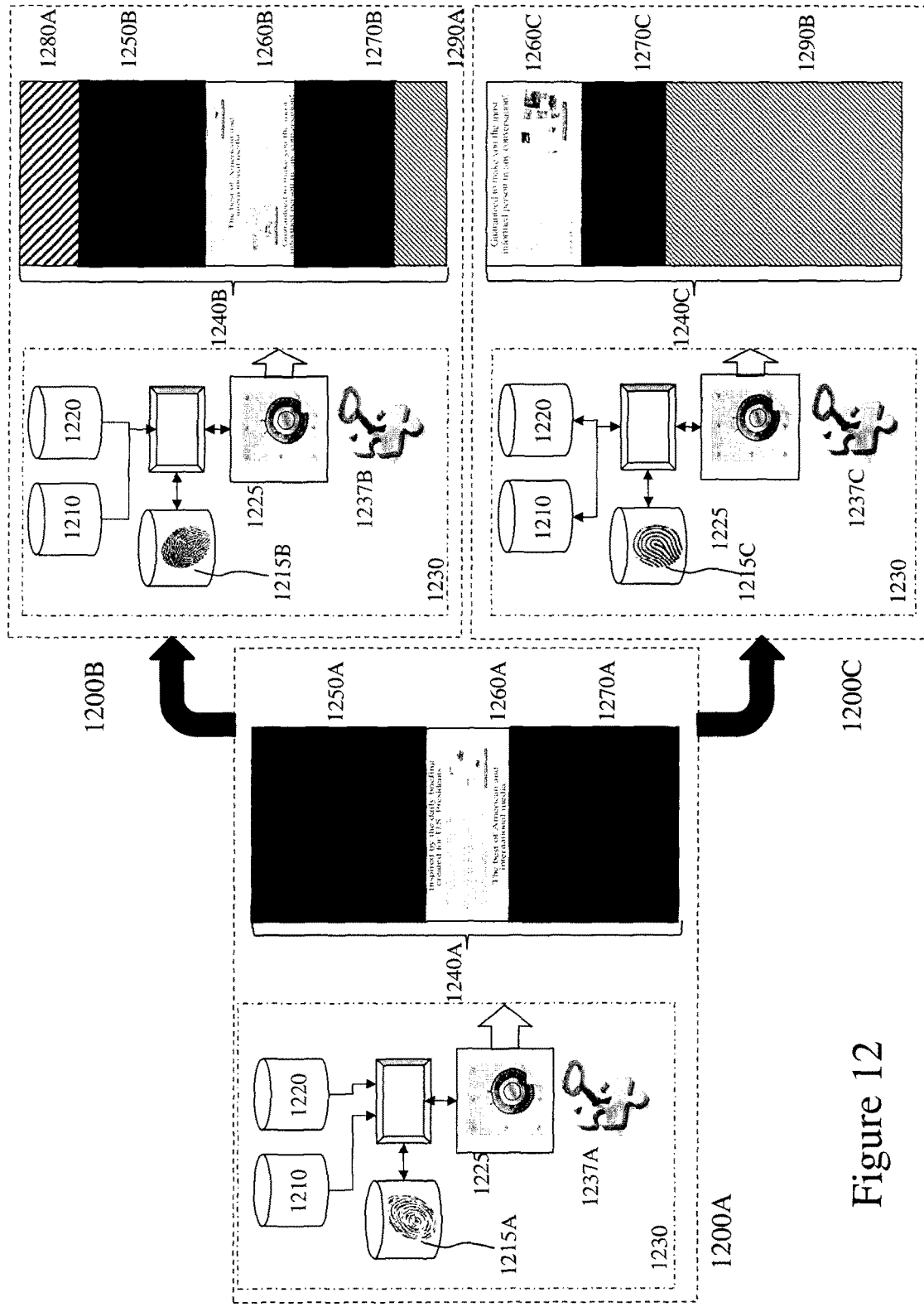
FIG. 12 depicts dynamic migration of a user's viewing window within retrieved merged primary and secondary content in response to a characteristic of the user according to an embodiment of the invention.

Now referring to FIG. 12 there is depicted dynamic migration of a user's viewing window within retrieved merged primary and secondary content in response to a characteristic of the user according to an embodiment of the invention to provide improved continuity of the user movement through the primary/secondary content over the prior art. Accordingly, in first view 1200A a user is accessing the software system 1230 from an electronic device, not shown for clarity, wherein the software system 1230 retrieves content 1240A comprising primary content from the primary content storage 1210 and secondary content from the secondary content storage 1220. These, as discussed above in respect of FIGS. 10 and 11 are merged and rendered prior to being fingerprinted with first fingerprint 1215A, retrieved from key server 1225, and then encrypted with key 1237A. Of the content 1240A retrieved, merged, rendered, fingerprinted, encrypted and transmitted to the user's electronic device the viewer is presented with window 1260A representing that portion of the merged and rendered content that can be displayed in the display of the user's electronic device. The remainder of the content 1240A is depicted by prior portion 1250A and subsequent portion 1270A representing portions of the content that precede and follow the content displayed within the window.

Next in second view 1200B the user has elected to scroll through the content such that the electronic device now displays first new window 1260B to the user, being part of the subsequent content. Accordingly, the software application on the electronic device transmits a request for additional content to the software system 1230 which triggers additional requests to the primary content storage 1210 and secondary content storage 1220. This new primary and secondary content is merged and rendered prior to being fingerprinted with second fingerprint 1215B and then encrypted with second key 1237B. As shown in second view 1200B this new content is represented by new content 1290A whilst the software application deletes dumped portion 1280A, and displays second window 1260B. Remaining portions of the prior portion 1250A and subsequent portion 1270A in first view 1200A are depicted as first and second residual portions 1250B and 1270B respectively.

Second view 1200B represents a slow scroll by the user through the Title, whereas third view 1200C represents a faster scrolling process. Accordingly, the software application on the electronic device transmits a request for additional content to the software system 1230 which triggers additional requests to the primary content storage 1210 and secondary content storage 1220. This new primary and secondary content is merged and rendered prior to being fingerprinted with third fingerprint 1215C and then encrypted with third key 1237C. As shown in third view 1200C this is represented by new content 1290B. There is no remaining prior portion as this has been deleted completely. The content which remains is third window 1260C and subsequent portion 1270C.

Accordingly, as the user increases an aspect of scrolling, such as for example, speed of finger motion on a touch sensitive display or multiple repeated scrolling motions, the software application adjusts the requests to the software system and essentially slides the viewer window, depicted by first to third windows 1260A through 1260C respectively, within the retrieved content 1240A through 1240C respectively. It would also be evident to the user that the amount of content retrieved between first, second and third views 1200A through 1200C respectively may be varied according to characteristics of the user's scrolling as well as in dependence of other factors including but not limited to, device display characteristics, characteristics of rendered content in the direction of scrolling, and transmission data rate between the software application and the software system.

Within descriptions of embodiments of the invention encryption is referred to for transmitting the merged and rendered primary and secondary content from the software system to the software application in execution upon the user's electronic device wherein the received content is decrypted. Alternatively, the encryption described in respect of content transmittal may be implemented through different protocols including, for example, Hypertext Transfer Protocol Secure (HTTPS). This may be used to automatically encrypt content data being transmitted with SS-AS specific encryption occurring on the Client's device automatically within the reader software upon its receipt so that the content is encrypted on the Client's device. It would be evident to one skilled in the art that embodiments of the invention may exploit one or more of the encryption/decryption techniques known within the prior art as well as those established in future. It would also be evident that the encryption/decryption techniques and/or key/algorithm complexity may vary according to factors including, but not limited to, the primary content, the secondary content, the network, the user's enterprise, and user preference.

Within the descriptions of embodiments of the invention reference is made to fingerprinting the merged and rendered content prior to its encryption and transmission to the user's electronic device for decryption and display. Within computer science, a fingerprinting algorithm normally refers to a procedure that maps an arbitrarily large data item (such as a computer file) to a much shorter bit string, its fingerprint, that uniquely identifies the original data for all practical purposes just as human fingerprints uniquely identify people for practical purposes. Fingerprints are typically used to avoid the comparison and transmission of bulky data such as for instance, a web browser or proxy server can efficiently check whether a remote file has been modified, by fetching only its fingerprint and comparing it with that of the previously fetched copy. However, with respect to some embodiments of the invention we refer to fingerprint functions as high-performance hash functions used to uniquely identify substantial blocks of data where cryptographic hash functions may be unnecessary or are complemented with the fingerprint. Within other embodiments of the invention fingerprinting refers to embedding data for source tracing. A fingerprint is embedded into the merged and rendered digital content at the point, or each point of distribution. If a copy of the work is found later, then the fingerprint may be retrieved from the copy and the source of the distribution is known. It would be evident to one skilled in the art that the fingerprint may be derived from a variety of information including, but not limited to, the CogniUser™ ID of the user to whom the merged and rendered content is intended, data relating to the electronic device to which the content is delivered, time, date, pseudo-randomly generated codes which are stored within a database on the software system servers with cross-reference to CogniUser™ ID etc, images, multimedia content, mathematically generated keys.

It would be evident to one skilled in the art that each transmission of primary and secondary content may include one, two, or more fingerprints. These fingerprints may be imperceptible, if the original cover signal and the marked signal are (close to) perceptually indistinguishable, or perceptible if its presence in the marked signal is noticeable, but non-intrusive. Typically, the length of the embedded message determines two different main classes of digital watermarking schemes, zero-bit and n-bit streams. Where the message is conceptually zero-bit long and the system is designed in order to detect the presence or the absence of the watermark in the marked object then these fingerprinting schemes are usually referred to as zero-bit or presence fingerprinting schemes. Sometimes, this type of fingerprinting scheme is called 1-bit watermark, because a 1 denotes the presence (and a 0 the absence) of a fingerprint in any verification detection system. Where the message is an n-bit-long stream $m = m_1 \ldots m_n$, $n \in N$, with $n = |m|$ or $M = \{0,1\}^n$ and is modulated in the fingerprint. These kinds of schemes usually are referred to as multiple-bit fingerprinting or non-zero-bit fingerprinting schemes.

According to embodiments of the invention different techniques for embodiment of the fingerprint may employed. These may include, for example, spread-spectrum techniques, establishing marked data obtained by an additive modification of the original content with the fingerprint; quantization techniques, establishing marked data obtained by quantization; and amplitude modulation, and establishing marked data obtained by additive modification in a manner to spread spectrum techniques but is embedded in the spatial domain.

Figure 13:
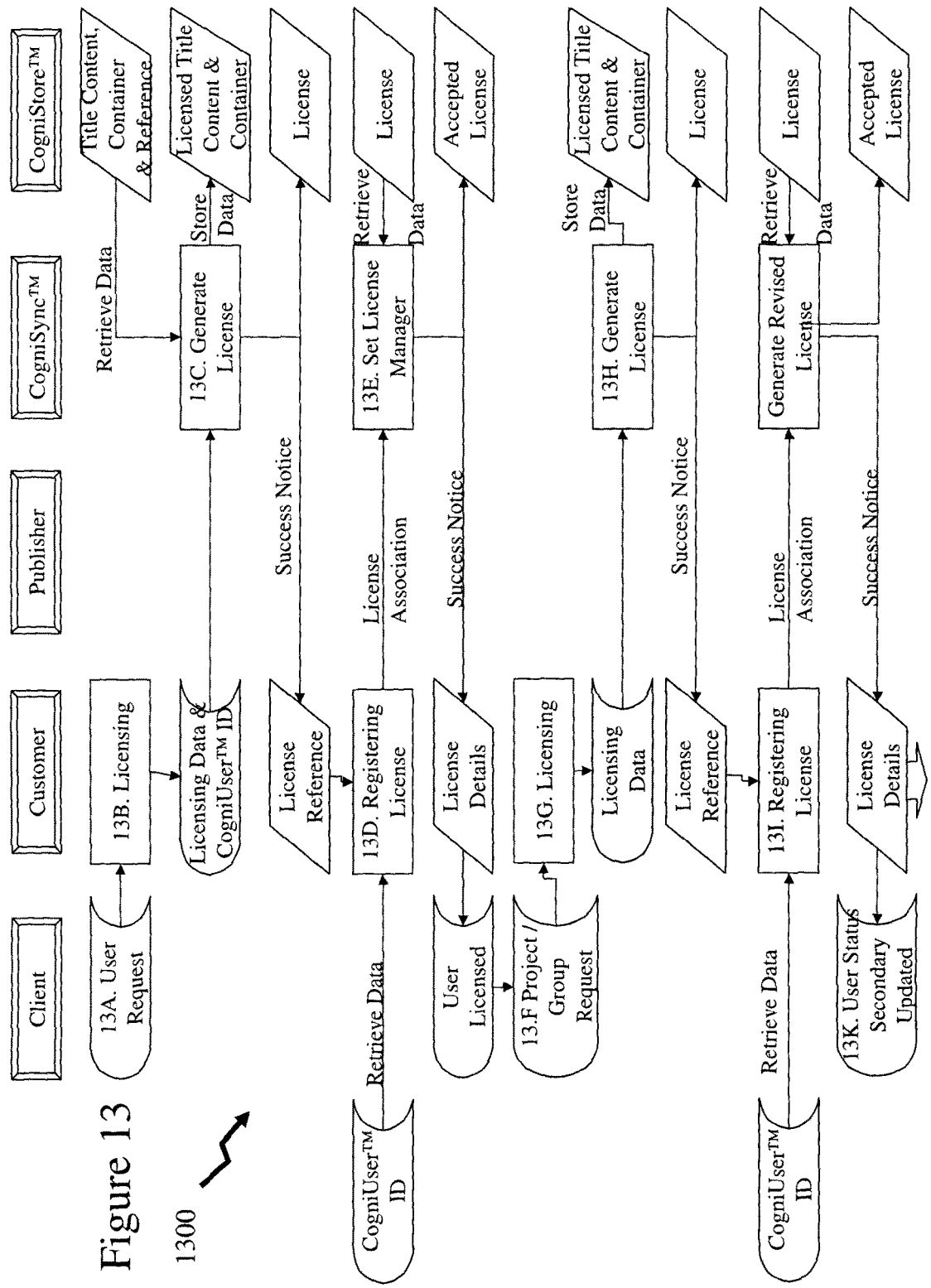
FIG. 13 depicts a flowchart according to an embodiment of the invention for a curator assigning a new user access rights to primary content and subsequently assigning their secondary rights.

Referring to FIG. 13 there is depicted a flowchart 1300 according to an embodiment of the invention for a curator assigning a new user access rights to primary content and subsequently assigning their secondary rights. As depicted flowchart 1300 comprises 11 together with their associated elements to/from each level of Client, Customer, Publisher, CogniSync™, and CogniStore™. These steps being:

13A. User Request: where a user requests from a curator access to a Title. For example, the curator may be a librarian within an enterprise and the user may be an employee or partner of the enterprise.

13B. Licensing: is done by the Customer using the Title Reference and a Title Request from the curator to send this to the CogniSync™ wherein this data is employed in conjunction with a valid account, defined through a CogniUser™ ID in step 13C.

13C. Generate License: uses the Licensing Data in conjunction with the Title Content and Title Container to generate a customised version of the Title Content and Title Container that has fingerprinting embedded within both structures where the customization relates to one or more aspects of the Licensing Data. The external License Reference is then sent on behalf of the publisher to the Customer's specified email(s) used when registering their account and may be an individual user or an enterprise's curator for example.

13D. Registering License: is the next step which taken by the Customer supplying CogniSync™ with the CogniUser™ ID of the user at the time of acceptance of the License, thereby accepting delivery of the content.

13E. Set License Manager: is the process in which CogniSync™ delivers the License to the Client recording the association, and allowing the CogniStore™ computer system to track delivery as the Accepted License. Additionally the License Details are now sent to the CogniUser™ ID for confirmation.

Additional elements and steps within the user registration and licensing process as described with respect to steps 13A through 13E have not been described for simplicity of the descriptions of the activities within flowchart 1300. Many of these are described above in respect of FIGS. 8A through 8E.

13F. Project Group Request: in this step the user requests access to a project either as part of their ongoing activities or as a review of previous activities. This request is transmitted to the curator thereby triggering steps 13G Licensing, 13H Generate License, and 13I Registering License. These steps being essentially the same as steps 13B through 13D as discussed above in respect of flowchart 1300.

13J. User Secondary Status Updated: the result of the steps 13G through 13J is that the user may now access secondary content relating to the Title originally requested in step 13A which is classed with the project identity to which their license was extended.

Figure 14:
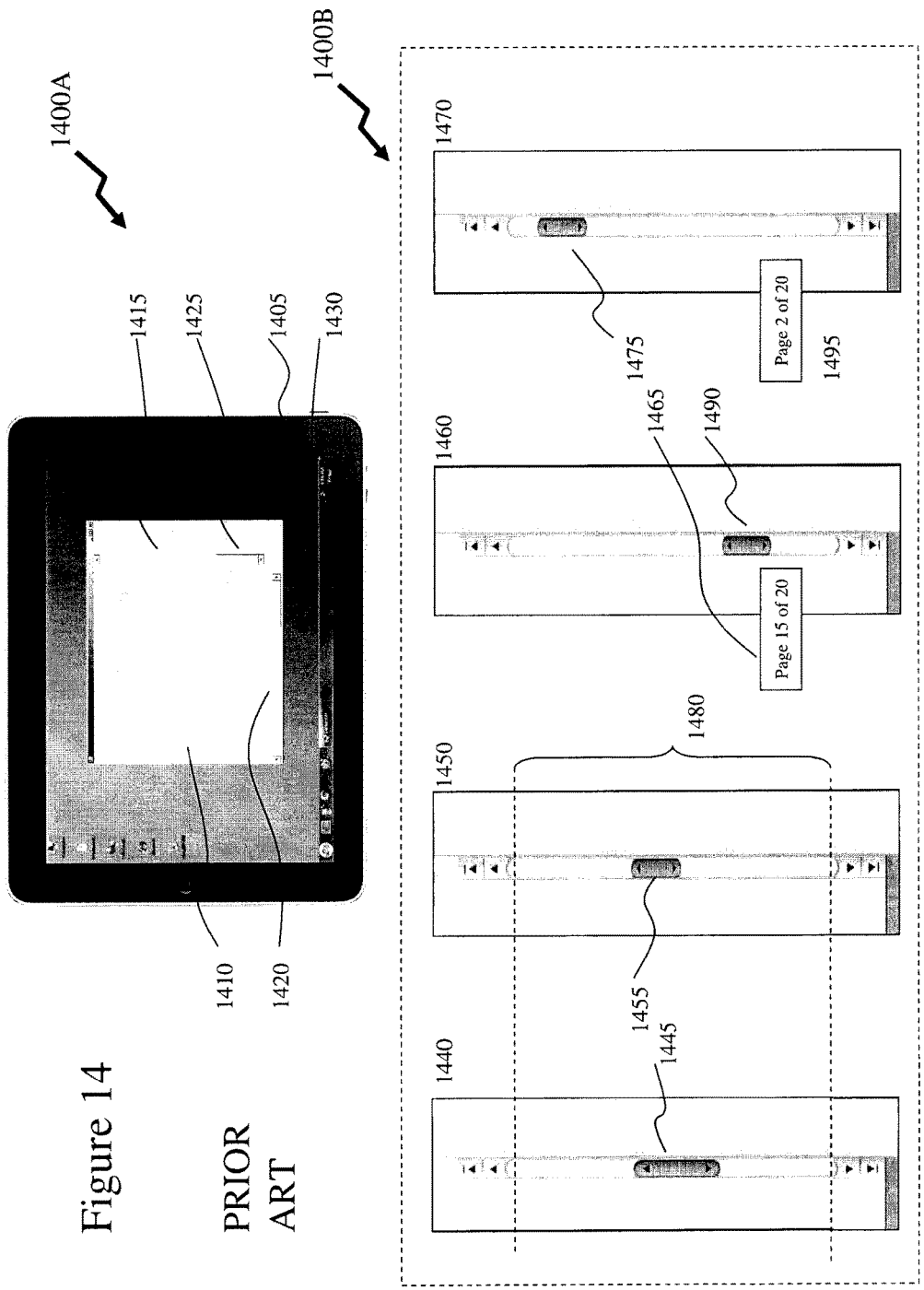
FIG. 14 depicts prior art solutions to scroll bars in documents having content larger than can be displayed in a single screen rendering.

Now referring to FIG. 14 there are depicted prior art solutions to scroll bars in documents having content larger than can be displayed in a single screen rendering. First image 1400A depicts a screen 1430 on an electronic device 1405 having vertical scroll bar 1415 and horizontal scroll bar 1420 in conjunction with rendering window 1410 upon which content is presented to the user. Due to the dimensions of the full content the rendering window 1410 cannot display it all thereby requiring that the user uses the scroll sliders 1425 with each of the vertical scroll bar 1415 and horizontal scroll bar 1420 to view the full content. Rendering window 1410 may be thought of as a portal through which the full content can be viewed in part. Unlike a conventional portal that moves relative to the object the scroll sliders effectively move the full content around with a fixed portal. Adjustments to the size of the screen 1430 or different dimensions of the full content result in the selectivity of the scroll sliders within each of the vertical scroll bar 1415 and horizontal scroll bar 1420 varying.

Within the prior art the relative size of scroll slider 1425 to vertical scroll bar 1425 reduces in direct relation to the ratio of the rendering window 1410 relative to the vertical dimension of the full content as shown by first and second scroll bars 1440 and 1450 within second image 1400B. The same occurring for the horizontal slider. In first scroll bar 1440 the ratio between the window within which content is rendered and the content is not too large and accordingly the scroll slider 1445 is relatively large with respect to first scroll bar 1440. In second scroll bar this ratio has increased resulting in a smaller scroll slider 1455 with respect to the second scroll bar 1450. The range of each of first and second scroll bars 1440 and 1450 being the same as denoted by range marker 1480. As such for a large document a small scroll slider results making its manipulation difficult, and accordingly some prior art solutions reduce the scroll slider linearly until a predetermined minimum dimension is reached.

However, locating where the user is within a large document with a small rendering window 1410 to the dimensions of the content with the prior art approach of first image 1400A. As such third and fourth scroll bars 1460 and 1470 within second image 1400B depicts another prior art approach. In third scroll bar 1460 as the user moves the third scroll slide 1490 a first pop-up window 1465 appears denoting that the user is currently viewing content on the $15^{th}$ page of 20 pages overall. As such when the user moves the scroll slider further as denoted by fourth scroll slide 1475 in fourth scroll bar 1470 this pop-up window changes to second pop-up window 1495 indicating the user is now at the $2^{nd}$ page of 20. However, whilst the user is provided with an indication of the page that does not provide them with any additional context of their location in the content as would be beneficial where a Title may be 20, 100, 500, 1000 pages. Additionally, there is no additional information that a section within the Title the user seeks is only a small part of a page whereas other sections of the Title are multiple pages long.

Figure 15:
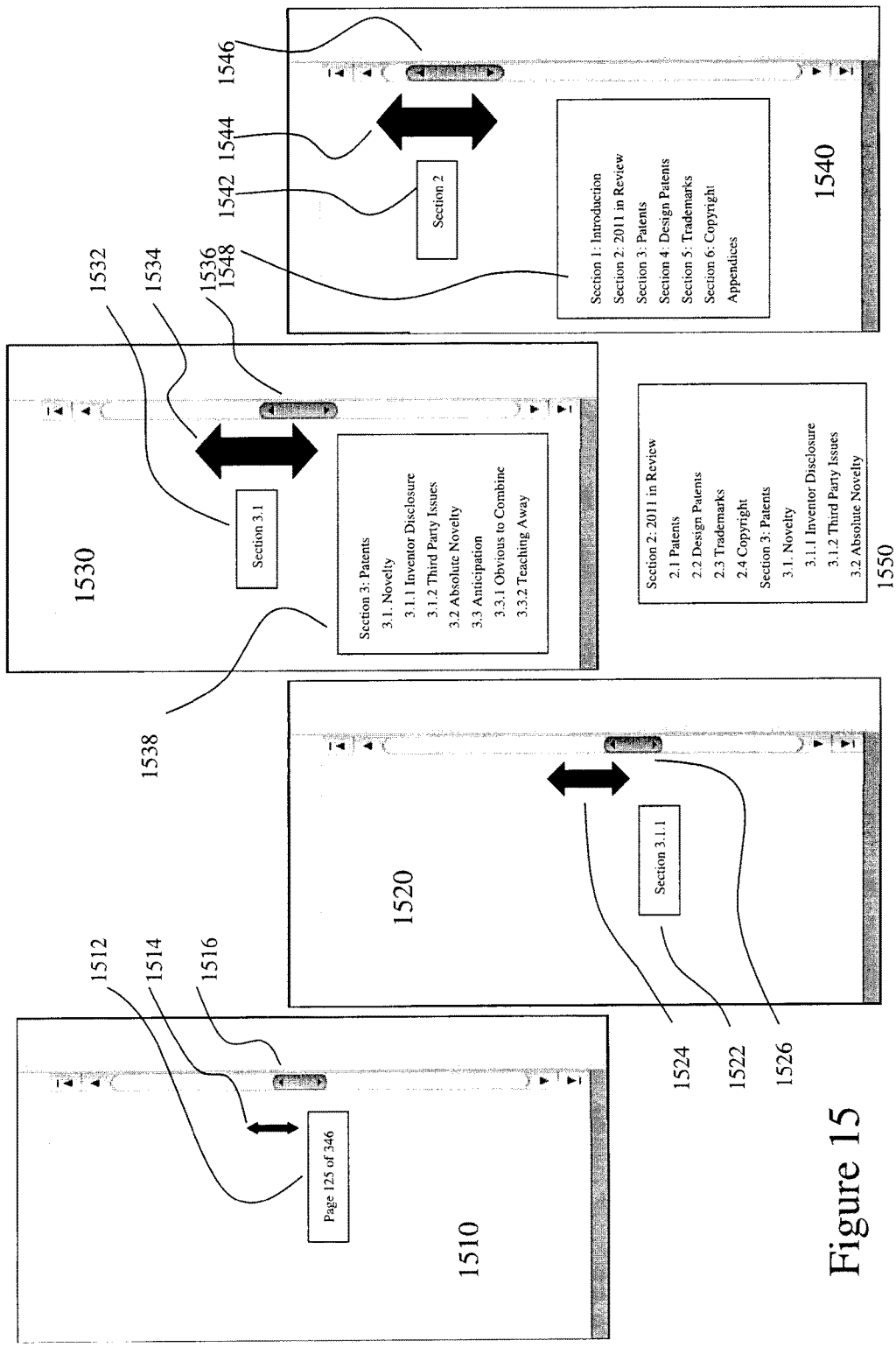
FIG. 15 depicts a scroll bar according to an embodiment of the invention wherein the functionality and display of the scroll bar vary in dependence upon a characteristic of the user's action with the software application rendering content to the user.

Referring to FIG. 15 there are depicted first to fourth scroll bars 1510A to 1510D respectively according to an embodiment of the invention wherein the functionality and display of the scroll bar vary in dependence upon a characteristic of the user's action with the software application rendering content to the user. First scroll bar 1510A depicts the scroll bar according to an embodiment of the invention under a first user motion 1514 of the scroll slider 1516 wherein a first pop-up window 1512 appears, in this instance denoting that the user is at page 125 of 346. Now referring to second scroll bar 1510B depicts the scroll bar according to an embodiment of the invention under a second user motion 1524 of the scroll slider 1526 wherein a second pop-up window 1522 appears, in this instance denoting that the user is at "Section 3.1.1."

Further, referring third scroll bar 1530 depicts the scroll bar according to an embodiment of the invention under a third user motion 1534 of the scroll slider 1536 wherein third and fourth pop-up windows 1532 and 1538 appear. Third pop-up window 1532 denoting that the user is at "Section 3.1" whilst fourth pop-up window 1538 displays the local hierarchy of the Title to the user based upon their location within the Title. The software application keeps the fourth pop-up window 1538 active for a period of time thereby allowing the user to move and select an item in the fourth pop-up window 1538 and skip to that section without trying to find it by scrolling with hit-and-miss results. Finally, referring fourth scroll bar 1540 depicts the scroll bar according to an embodiment of the invention under a fourth user motion 1544 of the scroll slider 1546 wherein fifth and sixth pop-up windows 1542 and 1548 appear. Fifth pop-up window 1542 denoting that the user is at "Section 2" whilst sixth pop-up window 1548 displays a higher level hierarchy of the Title to the user based upon their location within the Title. The software application keeps the sixth pop-up window 1548 active for a period of time thereby allowing the user to move and select an item in the sixth pop-up window 1548 and skip to that section.

Optionally, the movement of a cursor to or touch-screen action within an area of an item within the hierarchy displayed in sixth pop-up window 1548 results in any hierarchy below that element being displayed to the user such that for example "Section 3" expands to depict the hierarchy of this section such as listed in fourth pop-up window 1538. Alternatively fourth pop-up window 1538 may modify also based upon the movement of a cursor to or touch-screen action within an area of an item within the local hierarchy such that a linear swipe motion, for example, results in the local hierarchy scrolling according to the linear swipe motion such as shown in seventh pop-up window 1550 wherein the user has scrolled down resulting in Section 2 being displayed with part of Section 3 where the user was previously presented with the local hierarchy. It would be evident that the data presented in the pop-up windows may be shortened form of the hierarchy information or full extraction of the data for the hierarchy. Within the example shown the hierarchy is based upon the table of contents (TOC) but it would be evident to one skilled in the art that the hierarchy may be other information either derived from information provided by the publisher or generated during the processing of the Title by the software system upon its release by the publisher.

Figure 16:
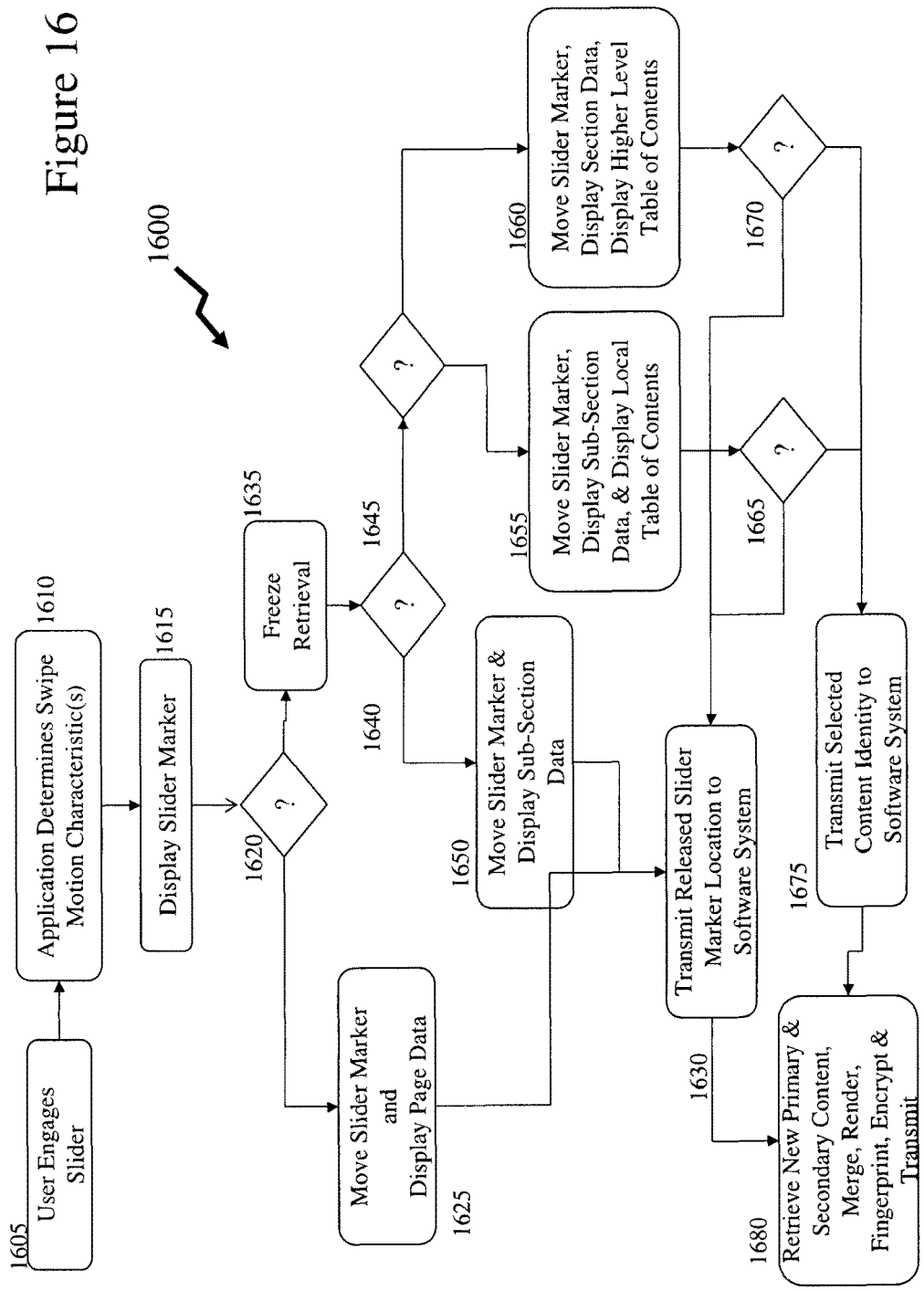
FIG. 16 depicts a process flow chart for a dynamically reconfigured scroll bar to a user such as described in FIG. 15 above according to an embodiment of the invention.

Referring to FIG. 16 there is depicted a process flow chart 1600 for a dynamically reconfigured scroll bar to a user such as described in FIG. 15 above according to an embodiment of the invention. Accordingly in step 1605 the process begins with the user engaging the slider, for example, through a swipe motion of the user such that in step 1610 the software application determines characteristics of the swipe motion and displays the slider marker in step 1615. In this manner rather than permanently displaying the slider it is displayed upon motion of the user which may be determined in step 1610 to be different to the normal slow scrolling motion of the user when reading through the Title content. From step 1615 the process proceeds to step 1620 wherein a characteristic of the user swipe, for example the speed of the swipe or the overall range of the swipe, exceeds a first threshold wherein the proceeds to step 1635 if it is exceeded and freezes the retrieval process, i.e. communications to the software system to retrieve additional primary and secondary content and retrieving local merged and rendered content, or proceeds to step 1625 wherein the slider marker of the slider is moved in response to the user action and the page data is provided through a pop-up window and the process proceeds to step 1630. In step 1630 the new slider marker location is transmitted to the software system and the process proceeds to step 1680 wherein new primary and secondary content is retrieved in dependence of the new slider marker location which is then merged, rendered, fingerprinted, encrypted and transmitted to the user's electronic device.

Where the characteristic of the user swipe exceeded the first threshold and the process proceeded to step 1635 it then proceeds to step 1640 to determine if the characteristic of the user swipe exceeds a second threshold or not wherein if so the process proceeds to determine in step 1645 whether the characteristic of the user swipe exceeds a third threshold. Based upon the determinations against the second and third thresholds the process proceeds to one of steps 1650, 1655 and 1660. In step 1650 the slider marker is moved in response to the user's actions, the pop-up window t with the section location information is displayed and the process proceeds to step 1630. In step 1655 the slider marker is moved in response to the user's actions, the pop-up window with the section location information is displayed together with the local TOC and the process proceeds to step 1665 to determine whether the user selects an item from the local TOC displayed within the pop-up window or stops moving (releases) the slider marker. Similarly, in step 1660 the slider marker is moved in response to the user's actions, the pop-up window with the TOC information is displayed and the process proceeds to step 1670 to determine whether the user selects an item from the TOC displayed within the pop-up window or stops moving (releases) the slider marker. In steps 1665 and 1670 a determination that the user has released the slider results in the process proceeding to step 1630 wherein the new location is transmitted and the process proceeds to step 1680 to retrieve the new content for display. If, however, the determination was that the user selected an item within the local hierarchy or TOC then the process proceeds to step 1675 wherein data relating to the selected element is transmitted to the software system and the process proceeds to step 1680 for retrieval of the new content.

It would be evident to one skilled in the art that the process flow 1600 may be expanded such as discussed above in respect of FIG. 15 to present the pop-up windows representing the TOC in a temporarily present manner such that the user may select items within the pop-up window, scroll within the TOC, or expand the TOC.

Referring to FIG. 17 there is depicted an indexing of primary content according to an embodiment of the invention such as described below in respect of FIGS. 18 and 19. Accordingly, a Title 1710 is received by the software system and indexed wherein terms within the Title are isolated and their locations defined within the resulting Title Index 1770. Accordingly, Title 1710 comprises header information 1720, preceding content 1730, and subsequent content 1740 to the content 1750 shown. Accordingly, occurrences of every unique term 1760 are captured and entered into Title Index 1770 in fields 1790 together with associated Title information section 1780. As shown the Title Index 1770 defines the locations of "Application", "Canada", and "Person" as unique terms as well as Title terms such as "28", "(1)", "(a)", etc. Accordingly, a full index of the Title is generated by the software system upon release of the Title and stored so that searching can be performed rapidly and with contextual search forms currently unavailable within the prior art.

According to an embodiment of the invention all unique terms in Title are captured in the Title Index. For each of the preceding content 1730, subsequent content 1740, and content 1750 within the Title the location of each term within the content is captured. Accordingly, the term index comprises a structure such as that shown below and as shown in the examples presented in Table 1.

TABLE 1

Examples of Table Index Entries and Structure

| | |
|---|---|
| [table Content Section list] | 1730 = 28.1 . . . |
| content id, content title | 1750 = 28.2(1) Subject Matter Not Previously Disclosed |
| | 1740 = 28.2(2) . . . |
| [table terms] | 1 = application |
| | 2 = Canada |
| | 3 = 3 = matter |
| | 4 = person |
| | 5 = subject |
| | 6 = the |
| [table Content Section meta] | 1730 = . . . |
| ;; content id, list of term ids | 1750 = 6, 5, 4, . . . , 1, . . . 2, . . . 1 . . . |
| in order of occurrence | 1740 = . . . |

Figure 18:
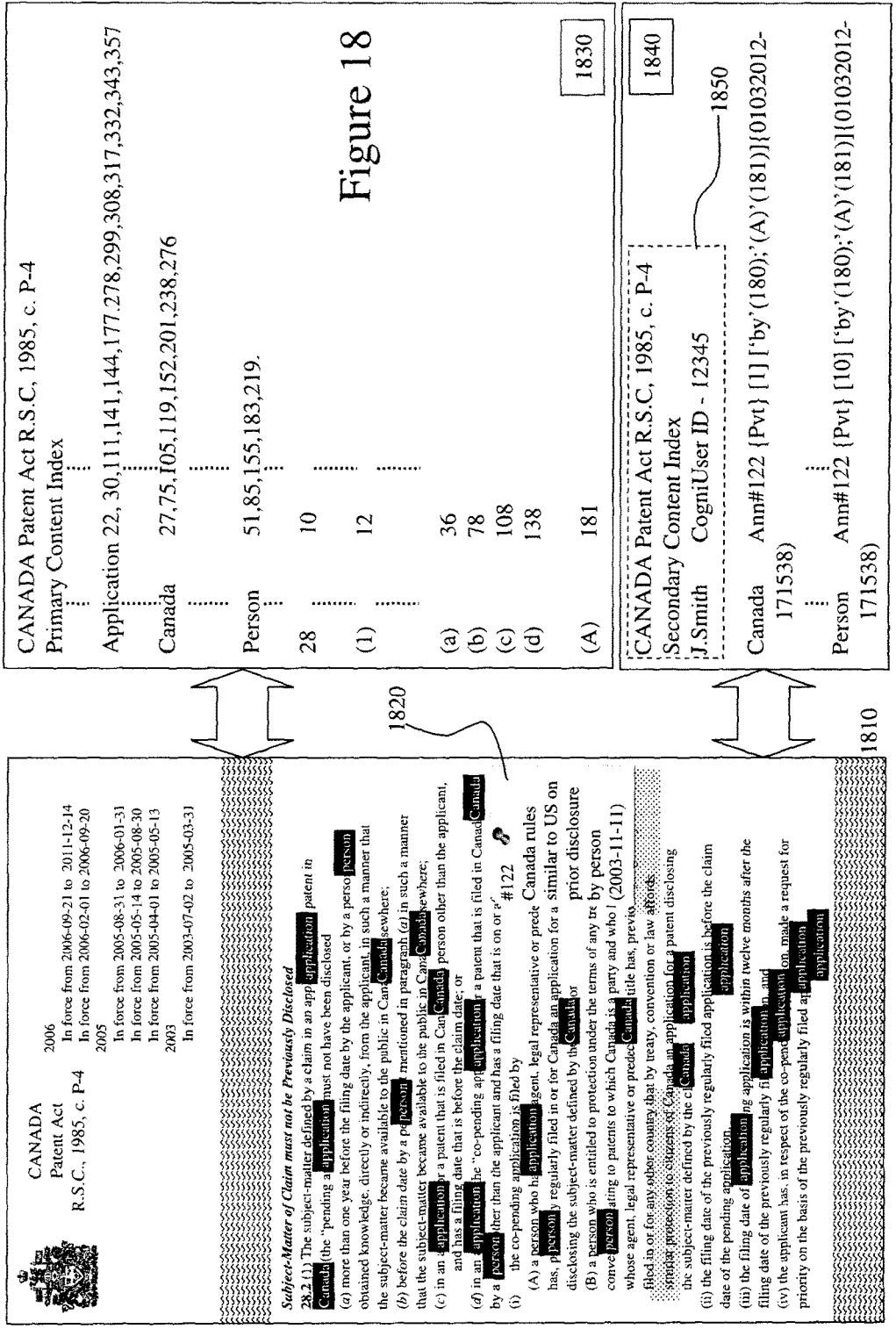
FIG. 18 depicts the indexing of primary and secondary content according to an embodiment of the invention.

Now referring to FIG. 18 there is depicted the indexing of primary and secondary content according to an embodiment of the invention wherein a Title 1810 has been released by a publisher and indexed by the software system to yield Title Index 1830. Subsequently, a user has licensed the Title and added an annotation 1820 to the section depicted. Once the annotation has been added then this is transmitted to the software system wherein it is indexed to generated Secondary Content Index 1840. Secondary Content Index 1840 includes a header 1850 which refers to the Title but also to the name of the user adding the annotation and the CogniUser™ ID. As shown the index is structured differently in that the terms are referenced by both their location within the annotation "[1]" for "Canada" but also the location of the annotation within the Title "['by'(180);'(A)'(181)]". Additionally the class of annotation is denoted by "{Pvt}" and a numeric number "Ann#122" denotes that this is the 122nd annotation of the user within the Title. Accordingly searches may be performed for occurrences of words, terms, etc within annotations as well as within the content of the Title and these may be filtered based upon other factors, including but not limited to, user identity and class.

According to an embodiment of the invention the location of an annotation/secondary content is given by the content section identifier and its word position within that content section. The content section metadata provides the word location by finding the highlighted content with the content section metadata. The highlighted terms are not indexed, just the range of highlighted terms (e.g. term position 10 to 11) are retained. Unique terms in an annotation note are added to the terms table. An Annotation metadata table is also maintained to store the term identities in order of occurrence within the annotation note using a structure such as that shown below and as shown in the examples presented in Table 2.

TABLE 2

Examples of Table Index Entries and Structure

| | |
|---|---|
| [table of Annotation] | 122 = private, [1750, 5, 7], |
| ;; id; type, position (content id, position), note, timestamp | "Canada rules similar to US . . . by person (2003-11-11)", |
| | 2012-02-16 10:12:12 |
| [table of Annotation Types] | private = private, yellow, |
| ;; name, access, formatting, . . . | |
| [table of Annotation meta] | 122 = 2, . . . , 4, |
| ;; annotation id, list of term ids in order of occurrence in annotation note | |

Figure 19:
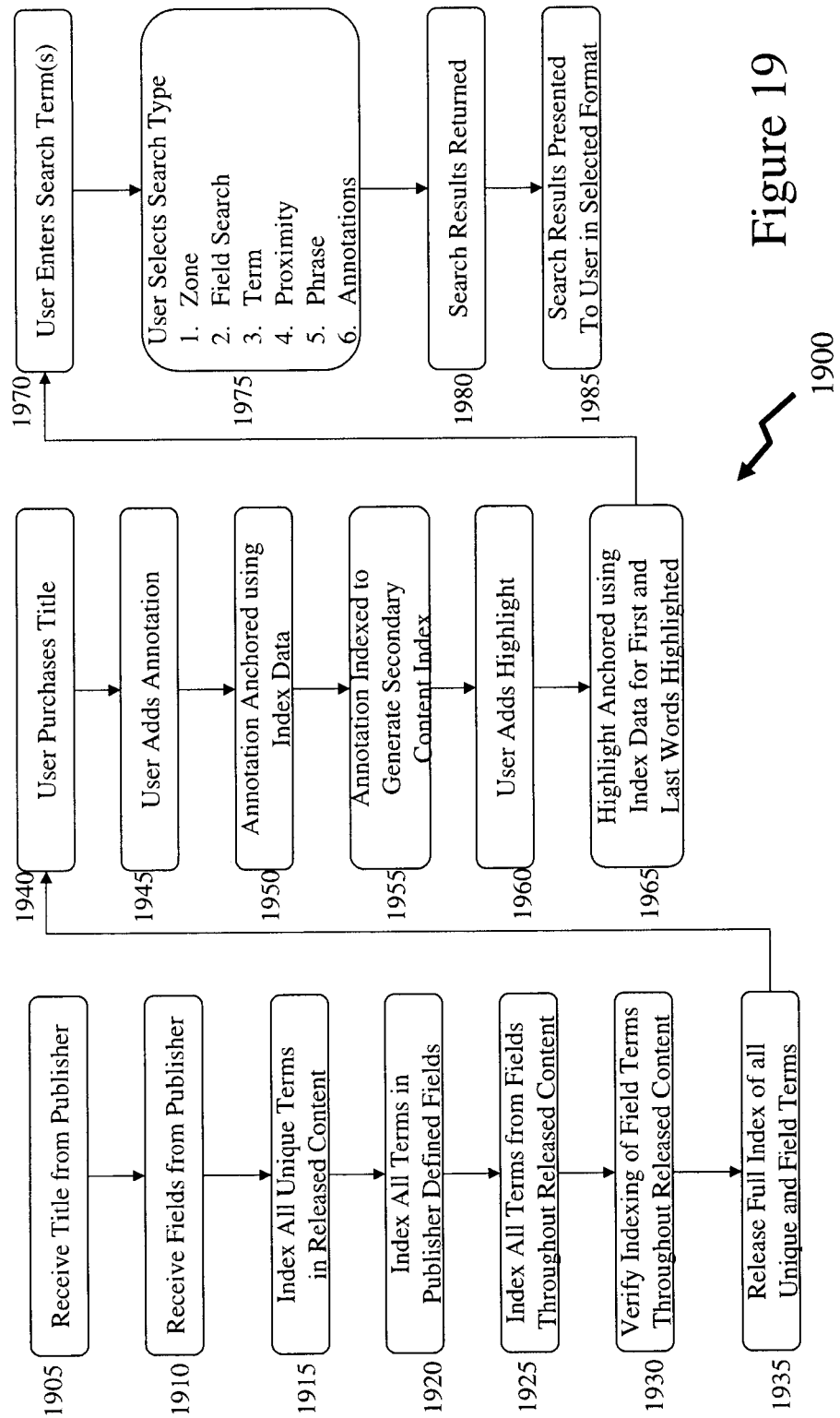
FIG. 19 depicts a flowchart according to an embodiment of the invention for indexing primary and secondary content.

Referring to FIG. 19 there is depicted a flowchart 1900 according to an embodiment of the invention for indexing primary and secondary content. Accordingly in step 1905 a Title is received from a publisher together with in step 1910 a list of fields, such as a Table of Contents (TOC). Next in step 1915 all unique terms within the Title are indexed such as depicted above in respect of FIGS. 18 and 19 followed by indexing the terms from the fields provided by the publisher in step 1920. Next in step 1925 these terms from the fields are indexed throughout the full content of the Title. Indexing the terms from the fields provides the user with the ability to search and find occurrences of these fields within the Title. Next in step 1930 the indexing of the terms from the fields is verified and then the full index is released in step 1935.

Subsequently in step 1940 a user purchases the title and in step 1945 adds an annotation to the Title which is then anchored in step 1950 to the Title using index data, such as depicted above in FIG. 18 by the "['by'(180);'(A)'(181)]." Next in step 1955 the annotation is indexed to generate a secondary content index associated with the user and the Title such as depicted by Secondary Content Index 1840 in FIG. 18 above. All such annotations, and user Secondary Content Indices 1840, are then stored within the software system so that subsequent retrievals by the user and others who has access rights to the annotations of the user are able to retrieve them merged and rendered with the primary content. Subsequently the user adds a highlight, step 1960, to the primary content which is stored as an annotation with a format such as depicted below in respect of (1) and anchored in step 1965.

$$\text{HGHLT}\{\text{Yellow}\}[\text{``}(iv)\text{''}(334);\text{``application''}(357)] \qquad (1)$$

Subsequently a user wishes to search within the primary and secondary content of the Title and enters their search terms in step 1970 before in step 1975 they select a search type which may be provided through the user selecting one or more options from a list including, for example but not limited to, zone, field search, term, proximity, phrase, and annotations. Within the context of this specification a zone may be established as regions of the Title such as title, preamble, contents, and appendices for example. Next in step 1980 the search results are returned and presented to the user in selected format in step 1985. Such selected formats may include for example, but not limited to, a tabulate list and highlighted markings within the Title which the user can step through to find an occurrence that they want.

Figure 20:
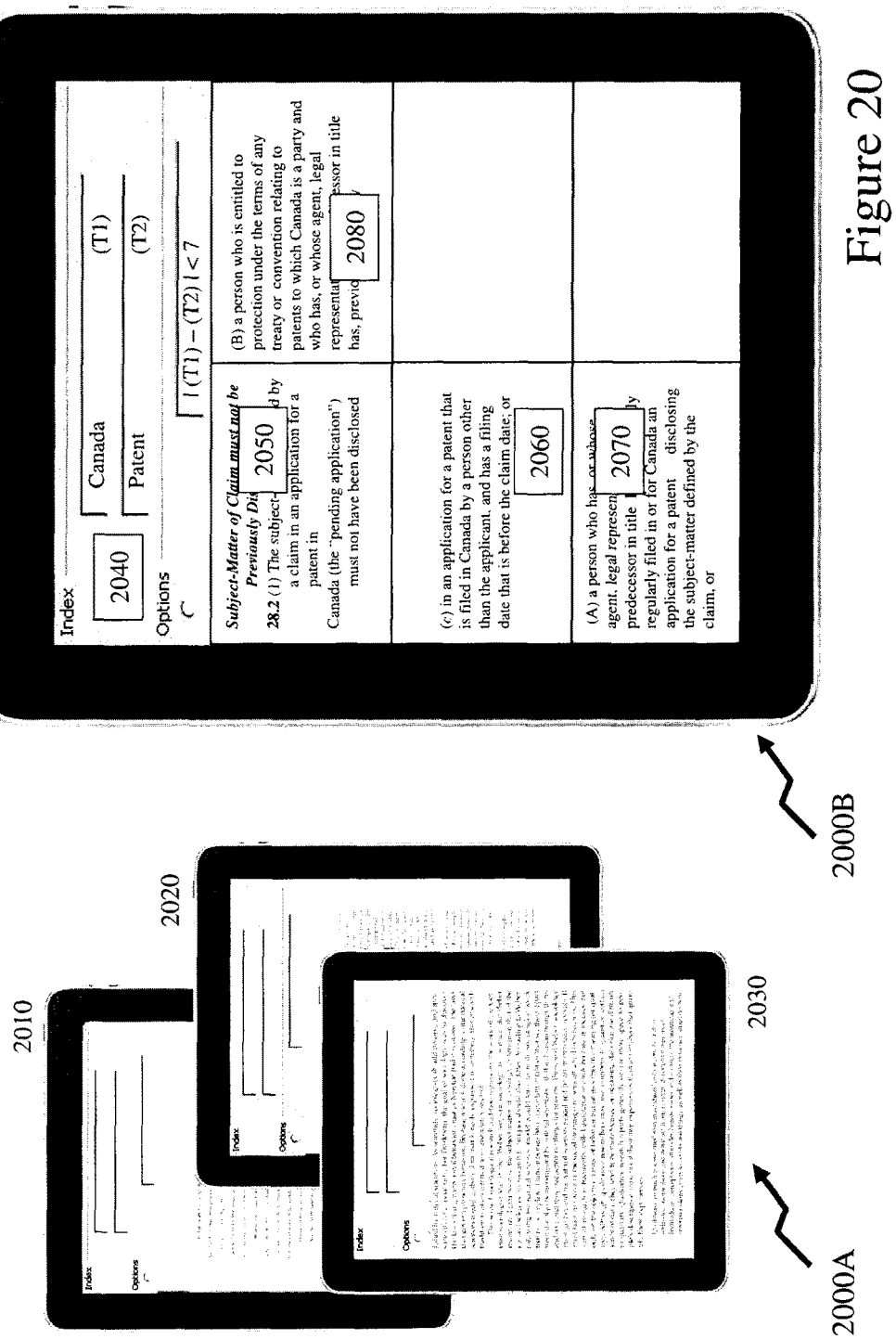
FIG. 20 depicts prior art searching result screen images and a searching result screen image according to an embodiment of the invention.

Referring to FIG. 20 there are depicted in first image 2000A first to third screens 2010 to 2030 arising from a search in a primary content with a search system according to the prior art. Entry of a search term or search phrase results in the search tool displaying a first screen 2010 representing the first occurrence of the search term or search phrase within the primary content. Subsequent occurrences of the search term or search phrase are presented to the user in second and third screens 2020 and 2030 respectively where the search engine within the application rendering the content to the user searches sequentially to each occurrence after the user selects a next option. Within the prior art the user may search for a single term or a phrase. However, in second image 2000B a screen arising from a search of a primary content with a software application according to an embodiment of the invention is presented. As depicted the user has searched for first term (T1) "Canada" and second term (T2) "Patent" but has selected an option wherein the distance between first term T1 and second term T2 is less than 7 words apart, i.e. (T1)–(T2)>−7. It would be evident to one skilled in the art that the order may also be specified, i.e. (T1)–(T2)<−7 defines first term T1 to occur prior to second term T2. As a complete index of the primary content it would be evident therefore that such a search simply requires that the complete index is processed for these terms and that establishing the distance between words is now a simple matter. However, as the locations of occurrences are now known from the complete index the software application can recover text at each occurrence and present multiple occurrences at once to the user as depicted in second screen 2020. The number of occurrences displayed and their manner may be varied according to preferences of the user and/or defaults of the software application. For example the first and second terms T1 and T2 may be highlighted, the retrieved content may be defined by structure and content, or the search terms may be limited to one or other of the primary content and secondary content or both.

It would be evident to one skilled in the art that the embodiments of the invention with respect to searching and indexing are to address that at present the majority of the information access and retrieval is done through human readable storage and contains redundant information. The independent file structures discussed above in respect of FIGS. 17 through 19 and below are intended to allow increased file sizes to be handled for full content indexing without significantly impacting, and potentially reducing, load times and requirements for information access.

Design assumptions within the methodologies according to embodiments of the invention include:

- sub-documents of the Title can be removed from a containing document so that their contents, primary content, can be loaded quickly based upon the network characteristics, Title, electronic device, user rights, secondary content etc;
  - this could cause issues with formatting if the primary content cannot be loaded linearly;
  - this allows for little to no string manipulation within the primary content unlike the prior art; and
  - a minimal loading approach can supply speed and efficiency;
- document ID is used potentially only during versioning, as such Document ID is not generally used within the electronic device but this may be an extension to deal with versioning and annotations, so that annotations can be automatically shared between the same version for multiple users and multiple versions for multiple users. Extending versioning would allow annotations to be "rolled-back" with versions of the Title so that a user can see the annotations at a particular version or point in time;
- searches are generally remade to make use of the more detailed memory structure of the document and full indexing for primary content and all secondary content which may be dynamic in instances of public content, crowd sourcing etc;
- generally document divisions instigated by the publisher have no real meaning for uniqueness when dealing with proximity or phrase searches and rendering primary and secondary content;
- typically searches have no "look back" approach but only forward looking searches whereas searches according to embodiments of the invention with indexing of primary and secondary content by date, time, user, version etc (see for example Ann#122 {Pvt} [1] ['by' (180);'(A)'(181)]{01032012-171538} in FIG. 19 wherein the annotation was added at 17:15:38 pm on Jan. 3, 2012; and
- fields do not typically span documents, this is so that a search {fd: definition "word1" "word2": proximity @9} does not span two or more documents. In this instance the search seeks to find two words "word1" and "word2" in a forward proximity search from the current location wherein the words must be within 9 terms of each other; and
- fields may contain other fields.

Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium"

includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of providing an indexed item of content to a user comprising:

retrieving an item of text content based content forming part of an item of multimedia content on a computer system comprising a memory and a microprocessor, a predetermined portion of item of multimedia content for subsequent transmission via a network to an electronic device for display to the user upon a desktop publishing application in execution upon the electronic device in response to a request from the user;

automatically parsing the item of text content based content with the microprocessor to identify each occurrence of a unique text item of a plurality of unique text items within the item of text content based content;

automatically associating a unique specific location information within the item of text content based content to each occurrence of the unique text item of the plurality of unique text items within the item of text content based content;

automatically generating and storing within the memory a content index of the item of text content based content forming part of the item multimedia content, each entry within the content index comprising a unique text item of the plurality of unique text items and the specific location information relating to each occurrence of the unique text item of the plurality of unique text items within the item of multimedia content; and automatically generating and storing within the memory an annotation index of the item of multimedia content, each entry within the annotation index comprising a unique annotation item of the plurality of unique annotation items and the specific location information relating to each occurrence of the unique annotation item of the plurality of unique annotation items within the item of annotation content; wherein the annotation index and content index are transmitted with the item of multimedia content over the network to the electronic device for use by the user through the desktop publishing application in either navigating or searching within the item of multimedia content for at least one of a unique text item, a unique annotation item, a combination of unique text items, a combination of unique annotation items and a combination of a unique text item and a unique annotation item.

2. The method according to claim 1, further comprising;

retrieving data relating to a structure of the item of multimedia content;

automatically parsing the content to identify each occurrence of an element of the data of a plurality of elements of the data relating to the structure of the item of multimedia content within the multimedia content;

automatically associating unique specific location information within the item of multimedia content to each occurrence of the element of the data of the plurality of elements of the data relating to the structure of the item of multimedia content within the multimedia content; and automatically generating and storing within the memory a structure index of the item of multimedia content, each entry within the structure index comprising an element of the data of the plurality of elements of the data relating to the structure of the item of multimedia contents and the specific location information relating to each occurrence of the element of the data of the plurality of elements of the data relating to the structure of the item of multimedia content within the multimedia content; wherein the structure index is transmitted with the item of multimedia content over the network to the electronic device use by the user through the desktop publishing application in either navigating or searching within the item of multimedia content for either a specific portion of the item of multimedia content or for an association between a unique text item and a portion of the item of multimedia content.

3. The method according to claim 2, further comprising:
binding the item of multimedia content, the content index and structure index as a publication for distribution to users.

4. The method according to claim 1, wherein
the annotation index is generated by:
retrieving annotation content relating to annotations added by a user, each annotation being text based content entered by a user or another user with respect to a specific portion of the item of text content based content forming part of the item of multimedia content;
automatically parsing the annotation content to identify each occurrence of a unique annotation item of a plurality of unique annotation items within the annotation content;
automatically associating specific location information to each occurrence of the unique annotation item of the plurality of unique annotation items within the item of annotation content.

5. The method according to claim 4, wherein,
the annotation further comprises data determined in dependence upon the selection of at least one class of a plurality of classes by the user, each class associated with viewing rights of others with respect to the annotation which are defined independent of the right to access the item of multimedia content.

6. The method according to claim 1, wherein
each location information within an item of multimedia content is unique.

7. The method according to claim 1, further comprising
receiving from a user a plurality of search terms an indication of a predetermined word count within which the plurality of search terms should be within;
establishing instances where the specific location information for each search term of the plurality of search terms are within the predetermined range within the content index; and
rendering to the user a predetermined portion of the item of multimedia content including a first instance of the specific location information when each search term of the plurality of search terms are within the predetermined range.

8. The method according to claim 7, further comprising
sorting the established instances in dependence upon data relating to the structure of the item of multimedia content.

9. A non-transitory tangible computer readable medium encoding a computer process for execution by a processor, the computer process relating to the provisioning of an indexed item of content to a user comprising:
retrieving an item of text content based content forming part of an item of multimedia content on a computer system comprising a memory and a microprocessor, a predetermined portion of item of multimedia content for subsequent transmission via a network to an electronic device for display to a user upon a desktop publishing application in execution upon the electronic device in response to a request from the user;
automatically parsing the item of text content based content with the microprocessor to identify each occurrence of a unique text item of a plurality of unique text items within the item of text content based content;
automatically associating a unique specific location information within the item of text content based content to each occurrence of the unique text item of the plurality of unique text items within the item of text content based content; and
automatically generating and storing within the memory a content index of the item of text content based content forming part of the item multimedia content, each entry within the content index comprising a unique text item of the plurality of unique text items and the specific location information relating to each occurrence of the unique text item of the plurality of unique text items within the item of multimedia content; and
automatically generating and storing within the memory an annotation index of the item of multimedia content, each entry within the annotation index comprising a unique annotation item of the plurality of unique annotation items and the specific location information relating to each occurrence of the unique annotation item of the plurality of unique annotation items within the item of annotation content; wherein
the annotation index and content index are transmitted with the item of multimedia content over the network to the electronic device for use by the user through the desktop publishing application in either navigating or searching within the item of multimedia content for at least one of a unique text item, a unique annotation item, a combination of unique text items, a combination of unique annotation items and a combination of a unique text item and a unique annotation item.

10. The non-transitory tangible computer readable medium according to claim 9, the computer process further comprising;
retrieving data relating to a structure of the item of multimedia content;
automatically parsing the content to identify each occurrence of an element the data of a plurality of elements of the data relating to the structure of the item of multimedia content within the multimedia content;
automatically associating unique specific location information within the item of multimedia content to each occurrence of the element of the data of the plurality of elements of the data relating to the structure of the item of multimedia content within the multimedia content; and
automatically generating and storing within the memory a structure index of the item of multimedia content, each entry within the structure index comprising an element of the data of the plurality of elements of the data relating to the structure of the item of multimedia contents and the specific location information relating to each occurrence of the element of the data of the plurality of elements of the data relating to the structure of the item of multimedia content within the multimedia content; wherein the structure index is transmitted with the item of multimedia content over the network to the electronic device use by the user through the desktop publishing application in either navigating or searching within the item of multimedia content for either a specific portion of the item of multimedia content or for an association between a unique text item and a portion of the item of multimedia content.

11. The non-transitory tangible computer readable medium according to claim 10, wherein binding the item of multimedia content, the content index and structure index as a publication for distribution to users.

12. The non-transitory tangible computer readable medium according to claim 9, the computer process further comprising;

retrieving annotation content relating to annotations added by a user, each annotation being text based content entered by a user or another user with respect to a specific portion of the item of text content based content forming part of the item of multimedia content;

automatically parsing the annotation content to identify each occurrence of a unique annotation item of a plurality of unique annotation items within the annotation content;

automatically associating specific location information to each occurrence of the unique annotation item of the plurality of unique annotation items within the item of annotation content.

13. The non-transitory tangible computer readable medium according to claim 12, wherein the annotation further comprises data determined in dependence upon the selection of at least one class of a plurality of classes by the user, each class associated with viewing rights of others with respect to the annotation which are defined independent of the right to access the item of multimedia content.

14. The non-transitory tangible computer readable medium according to claim 9, wherein each location information within an item of multimedia content is unique.

15. The non-transitory tangible computer readable medium according to claim 9, the computer process further comprising;

receiving from a user a plurality of search terms an indication of a predetermined word count within which the plurality of search terms should be within;

establishing instances where the specific location information for each search term of the plurality of search terms are within the predetermined range within the content index; and rendering to the user a predetermined portion of the item of multimedia content including a first instance of the specific location information when each search term of the plurality of search terms are within a predetermined range.

16. The non-transitory tangible computer readable medium according to claim 15, the computer process further comprising;

sorting the established instances in dependence upon data relating to the structure of the item of multimedia content.

* * * * *